US012064761B2

(12) United States Patent
Delattre et al.

(10) Patent No.: US 12,064,761 B2
(45) Date of Patent: Aug. 20, 2024

(54) FLOW CELL WITH FLEXIBLE CONNECTION

(71) Applicant: Illumina, Inc., San Diego, CA (US)

(72) Inventors: Cyril Delattre, San Diego, CA (US); Minsoung Rhee, San Diego, CA (US); Jeffrey Liu, San Diego, CA (US); Wesley Cox-Muranami, San Diego, CA (US); Paul Crivelli, San Diego, CA (US); Jennifer Foley, San Diego, CA (US); Darren Segale, San Diego, CA (US); Jay Taylor, San Diego, CA (US); Matthew Hage, San Diego, CA (US); Philip Paik, San Diego, CA (US); Erik Allegoren, San Diego, CA (US); David Hertzog, San Diego, CA (US); Alex Moroz-Smietana, San Diego, CA (US); Xiaoxiao Ma, San Diego, CA (US); Tsukasa Takahashi, San Diego, CA (US); Brandon Westerberg, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 19 days.

(21) Appl. No.: 16/401,805

(22) Filed: May 2, 2019

(65) Prior Publication Data

US 2019/0351413 A1 Nov. 21, 2019

Related U.S. Application Data

(60) Provisional application No. 62/671,481, filed on May 15, 2018.

(30) Foreign Application Priority Data

Jun. 18, 2018 (NL) ..................................... 2021147

(51) Int. Cl.
*B01L 3/00* (2006.01)

(52) U.S. Cl.
CPC ......... *B01L 3/502715* (2013.01); *B01L 3/527* (2013.01); *B01L 2200/027* (2013.01);
(Continued)

(58) Field of Classification Search
CPC ............... B01L 3/502715; B01L 3/527; B01L 2300/0887; B01L 2200/06; B01L 2200/16;
(Continued)

(56) References Cited

U.S. PATENT DOCUMENTS 2,301,207 A 11/1942 Garretson et al.
7,771,656 B2 8/2010 Shibuya et al.
(Continued)

FOREIGN PATENT DOCUMENTS

CN 101194155 A 6/2008
CN 202379991 U 8/2012
(Continued)

OTHER PUBLICATIONS

Fluor-A-Pure PTFE Tubing, Feb. 21, 2016, retrieved using WayBack Machine https://web.archive.org/web/20160221014323/https://www.tblplastics.com/tubing/ptfe/ (Year: 2016).*
(Continued)

*Primary Examiner* — Matthew D Krcha
*Assistant Examiner* — Sophia Y Lyle
(74) *Attorney, Agent, or Firm* — HESLIN ROTHENBERG FARLEY & MESITI P.C.

(57) ABSTRACT

An instrument includes a reagent management system. The reagent management system includes a plurality of reagent wells, each reagent well operable to contain a reagent of a plurality of reagents positioned therein. The reagent management system is operable to select a flow of reagent from
(Continued)

one of the plurality of reagents. A flexible connection includes a laminate stack and includes a first flexible channel in fluid communication with the reagent management system. The first flexible channel is operable to route the flow of reagent therethrough. A flow cell includes a flow channel in fluid communication with the first flexible channel. The flow channel is operable to route the flow of reagent over analytes positioned in the flow channel. The flexible connection enables the flow cell to be moved by the instrument relative to a fixed reference point in the instrument.

31 Claims, 19 Drawing Sheets

(52) U.S. Cl.
CPC ....... *B01L 2200/06* (2013.01); *B01L 2200/16* (2013.01); *B01L 2300/0887* (2013.01)

(58) Field of Classification Search
CPC ........... B01L 2200/027; B01L 2200/04; B01L 2200/0689; B01L 2300/0877; B01L 2300/123; B01L 2400/0644; G01N 35/085; G01N 35/04; G01N 35/00584; G01N 2035/0401; G01N 2035/0439
See application file for complete search history.

(56) References Cited

U.S. PATENT DOCUMENTS

| | | | | |
|---|---|---|---|---|
| 9,791,409 | B2 | 10/2017 | Gordon et al. | |
| 2003/0012511 | A1* | 1/2003 | Lin | G02B 6/30 385/50 |
| 2003/0152488 | A1* | 8/2003 | Tonkovich | B01F 25/431 428/137 |
| 2004/0089057 | A1* | 5/2004 | Hobbs | G01N 30/74 73/61.58 |
| 2006/0019273 | A1 | 1/2006 | Connolly et al. | |
| 2006/0228952 | A1* | 10/2006 | Feldman | H01R 12/79 439/835 |
| 2007/0156208 | A1* | 7/2007 | Havell | A61N 5/0616 607/88 |
| 2008/0211884 | A1* | 9/2008 | Saito | B29C 53/38 347/85 |
| 2010/0111768 | A1* | 5/2010 | Banerjee | G01N 21/6456 422/82.08 |
| 2010/0166612 | A1 | 7/2010 | Lehto | |
| 2010/0323350 | A1* | 12/2010 | Gordon | G01N 27/44791 435/6.16 |
| 2011/0052446 | A1 | 3/2011 | Hirano et al. | |
| 2011/0242771 | A1* | 10/2011 | Bhattacharya | H05K 1/147 361/733 |
| 2012/0270305 | A1* | 10/2012 | Reed | G01N 35/1079 435/287.2 |
| 2013/0260372 | A1 | 10/2013 | Buermann et al. | |
| 2013/0341186 | A1 | 12/2013 | Hsu | |
| 2014/0248617 | A1* | 9/2014 | Shaikh | B01L 3/5027 435/6.11 |
| 2014/0259607 | A1* | 9/2014 | Hagerott | G01N 35/1004 29/428 |
| 2017/0199210 | A1 | 7/2017 | Ang et al. | |
| 2018/0057787 | A1 | 3/2018 | Friedman et al. | |

FOREIGN PATENT DOCUMENTS

| | | | | |
|---|---|---|---|---|
| CN | 105228749 | A | 1/2016 | |
| GB | 2156033 | | 10/1985 | |
| JP | 2004101218 | A | 4/2004 | |
| JP | 2005305878 | A | 11/2005 | |
| JP | 2011242348 | A | 12/2011 | |
| JP | 2016511001 | A | 4/2016 | |
| KR | 1020160040514 | A | 4/2016 | |
| KR | 1020150000885 | | 7/2016 | |
| TW | I484182 | B | 5/2015 | |
| TW | I513978 | | 12/2015 | |
| TW | I547695 | | 9/2016 | |
| WO | 2012/082178 | | 6/2012 | |
| WO | 2012082178 | A1 | 6/2012 | |
| WO | WO2012096703 | A1 | 7/2012 | |
| WO | WO2013151622 | A1 | 10/2013 | |
| WO | WO-2014146063 | A2 * | 9/2014 | G01N 1/30 |
| WO | 2016/189302 | | 12/2016 | |
| WO | 2016189302 | A1 | 12/2016 | |

OTHER PUBLICATIONS

PCT/US2019/030186 International Search Report and Written Opinion mailed Aug. 15, 2019, 6 pages.
First Examination Report, Intellectual Property of India, Application No. 202148040365 Mar. 18, 2022.
Examination Report (with translation) in Taiwanese Patent Application No. 110102314 filed Apr. 19, 2023, 29 pgs.
Examination Report (with translation) in United Arab Emirates Patent Application No. P6001844/2019 dated Oct. 30, 2023, 8 pgs.
Examination Report (untranslated) in Chinese Patent Application No. 201910402052.4 dated Feb. 3, 2024, 14 pgs.

* cited by examiner

FLOW CELL WITH FLEXIBLE CONNECTION

BACKGROUND

Many instruments that use microfluidic devices may include a reagent management system (RMS) that is capable of selecting and routing a plurality of reagents to a flow cell, wherein the RMS and the flow cell may be rigidly connected (i.e. connected such that the positions of the RMS and flow cell are held substantially fixed relative to each other). For example, the reagent management system may include a plurality of reagent wells that contain a variety of reagents, wherein each reagent well may be connected to a rotary selector valve. The rotary valve aligns with each reagent well in order to select any one of the reagents. A common line is then utilized to route the selected reagents from the rotary valve to an inlet port of a flow cell.

Analytes, such as DNA segments, nucleic-acid chains or the like, may be positioned in the flow channel. The selected reagents may flow through the flow cell in order to perform various controlled chemical reactions on the analytes. The chemical reactions may affect certain detectable properties related to the analytes. For example, one such detectable property may be light photons emitted from the analytes.

A detection module (such as an imaging module) may be positioned within the instrument. The detection module may be operable to scan the flow cell in order to detect the detectable properties. Device circuitry within the instrument may then process and transmit data signals derived from those detected properties. The data signals may then be analyzed to reveal properties of the analytes.

However, flow cells in many instruments are very sensitive to vibrations during a detection process. Additionally, in order to detect small features (such as light photons from the analytes) in the flow cell, the detection module may often be positioned relative to the flow cell with micron precision (e.g., plus or minus 100 microns or less).

Since the RMS and flow cell may be rigidly connected and may not move within the instrument, it is the detection module that may be moved relative to the flow cell as it scans over the flow cell. However, the detection module may be several orders of magnitude heavier and larger than the flow cell. As such, positioning the detection module with precision may be difficult. Additionally, the relatively large handling equipment needed to position the detection module may inadvertently vibrate the flow cell. Moreover, due to the size of the detection module and its associated handling equipment, scanning over several positions across the entire flow cell is costly and time consuming.

BRIEF DESCRIPTION

The present disclosure offers advantages and alternatives over the prior art by providing a flow cell connected in fluid communication to a reagent management system (RMS) with a flexible connection. The flexible connection enables the flow cell to be moved relative to a reference point on an instrument while the RMS is fixed relative to the reference point. As such, the flow cell may be moved relative to a detection module of the instrument while the detection module is also held stationary relative to the reference point. Additionally, because the flow cell is not rigidly coupled to the RMS, the flow cell may be positioned more precisely relative to a fixed reference point on the instrument than either the RMS or the detection module.

The RMS and flow cell may be included in a cartridge that is detachable from an instrument, wherein the flow cell may, or may not, be detachable from the cartridge Alternatively, the RMS may be rigidly attached to an instrument while the flow cell is detachable from the instrument.

Additionally, the flow cell and the flexible connection may be assembled together and included in a flexible connection module. The flexible connection module may be connected to a cartridge or to an instrument. The module may, or may not, be operable to detachably connect to an RMS in a cartridge or an instrument.

Since the flow cell is much lighter and smaller than a detection module, moving the flow cell may involve smaller and less costly handling equipment than that which may be involved for movement of the detection module. Further, movement of the flow cell, rather than the detection module, reduces vibrations that may affect the accuracy of detection of light photons, or other forms of detectable properties, related to analytes positioned in the flow cell. Additionally, the flow cell may be moved to various positions more quickly than a detection module may be moved in order to scan and detect the detectable properties.

Additionally, even if the detection module is mobile and the flow cell is fixed relative to a reference point of an instrument, the flexible connection may advantageously reduce vibrations transmitted to the flow cell by the RMS. This is because the flexible connection may dampen the vibrations produced by the RMS as they are transmitted through the flexible connection.

An instrument in accordance with one or more aspects of the present disclosure includes a reagent management system (RMS) operable to be positioned in the instrument. The RMS includes a plurality of reagent wells, each reagent well is operable to contain a reagent of a plurality of reagents positioned therein. The RMS is operable to select a flow of reagent from one of the plurality of reagents. A flexible connection is also operable to be positioned in the instrument. The flexible connection includes a first flexible channel in fluid communication with the RMS. The first flexible channel is operable to route the flow of reagent therethrough. A flow cell is also operable to be positioned in the instrument. The flow cell includes a flow channel in fluid communication with the first flexible channel. The flow channel is operable to route the flow of reagent over analytes positioned in the flow channel. The flexible connection enables the flow cell to be moved by the instrument relative to a fixed reference point in the instrument.

A cartridge of an instrument in accordance with one or more aspects of the present disclosure includes a reagent management system (RMS) operable to select a flow of reagent from one of a plurality of reagents contained in the RMS. A flexible connection is operable to be positioned in the cartridge. The flexible connection includes a first flexible channel in fluid communication with the RMS. The first flexible channel is operable to route the flow of reagent therethrough. A flow cell is operable to be positioned in the cartridge. The flow cell includes a flow channel in fluid communication with the first flexible channel. The flow channel is operable to route the flow of reagents over analytes positioned in the flow channel. When the cartridge is engaged with the instrument, the flexible connection enables the flow cell to be moved by the instrument relative to a fixed reference point in the instrument.

A flexible connection module in accordance with one or more aspects of the present disclosure includes a flexible connection and a flow cell. The flexible connection includes a first channel inlet via, a first channel outlet via and a first flexible channel in fluid communication therebetween. The first channel inlet via includes a fluidic seal operable to connect to an RMS outlet port and to enable a flow of reagent therethrough. The flow cell includes an inlet port, an outlet port and a flow channel in fluid communication therebetween. The inlet port is in fluid communication with the first channel outlet via of the flexible connection. The flow channel is operable to route the flow of reagent over analytes positioned in the flow channel.

DRAWINGS

The disclosure will be more fully understood from the following detailed description taken in conjunction with the accompanying drawings, in which.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example maybe combined with the features of other examples. Such modifications and variations are intended to be included within the scope of the present disclosure.

The terms "substantially", "approximately", "about", "relatively," or other such similar terms that may be used throughout this disclosure, including the claims, are used to describe and account for small fluctuations, such as due to variations in processing, from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1:
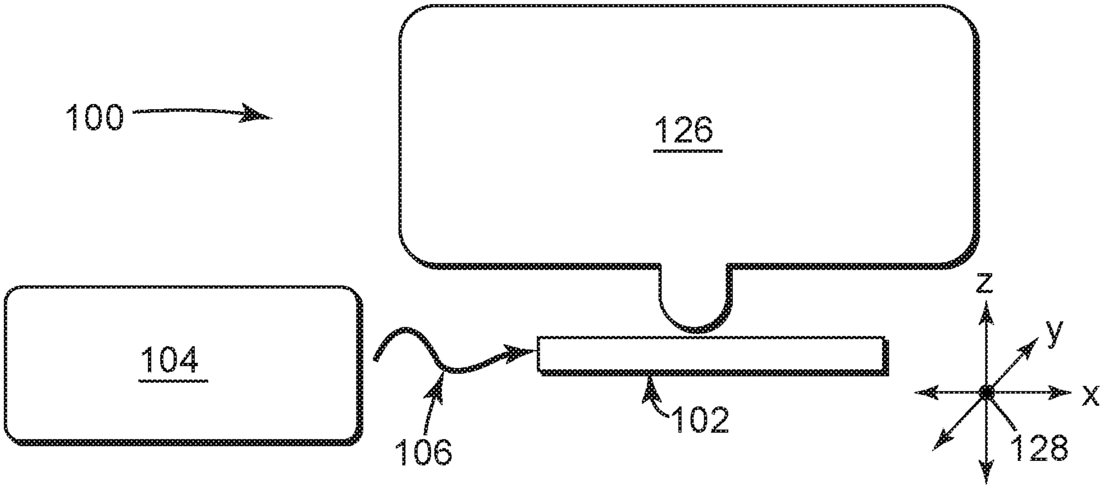
FIG. 1 depicts an example of a schematic block diagram of an instrument according to aspects disclosed herein.

Referring to FIG. 1, an example of a schematic block diagram of an instrument 100 according to aspects disclosed herein is depicted. The instrument 100 may be a sequencing instrument or other instrument that utilizes microfluidic devices.

The instrument 100 includes a flow cell 102 in fluid communication with a reagent management system (RMS) 104, wherein the RMS 104 and the flow cell 102 are mechanically and flexibly connected together by a flexible connection 106. The RMS 104 is capable of selecting and routing a plurality of reagents 108, 109, 110, 111, 112, 114, 116, 118 (herein 108-118) (best seen in FIG. 3) to the flow cell 102. For purposes herein, the term "flexible" and its derivatives include the capability of being turned, bowed, or twisted without breaking or losing functionality.

Figure 3:
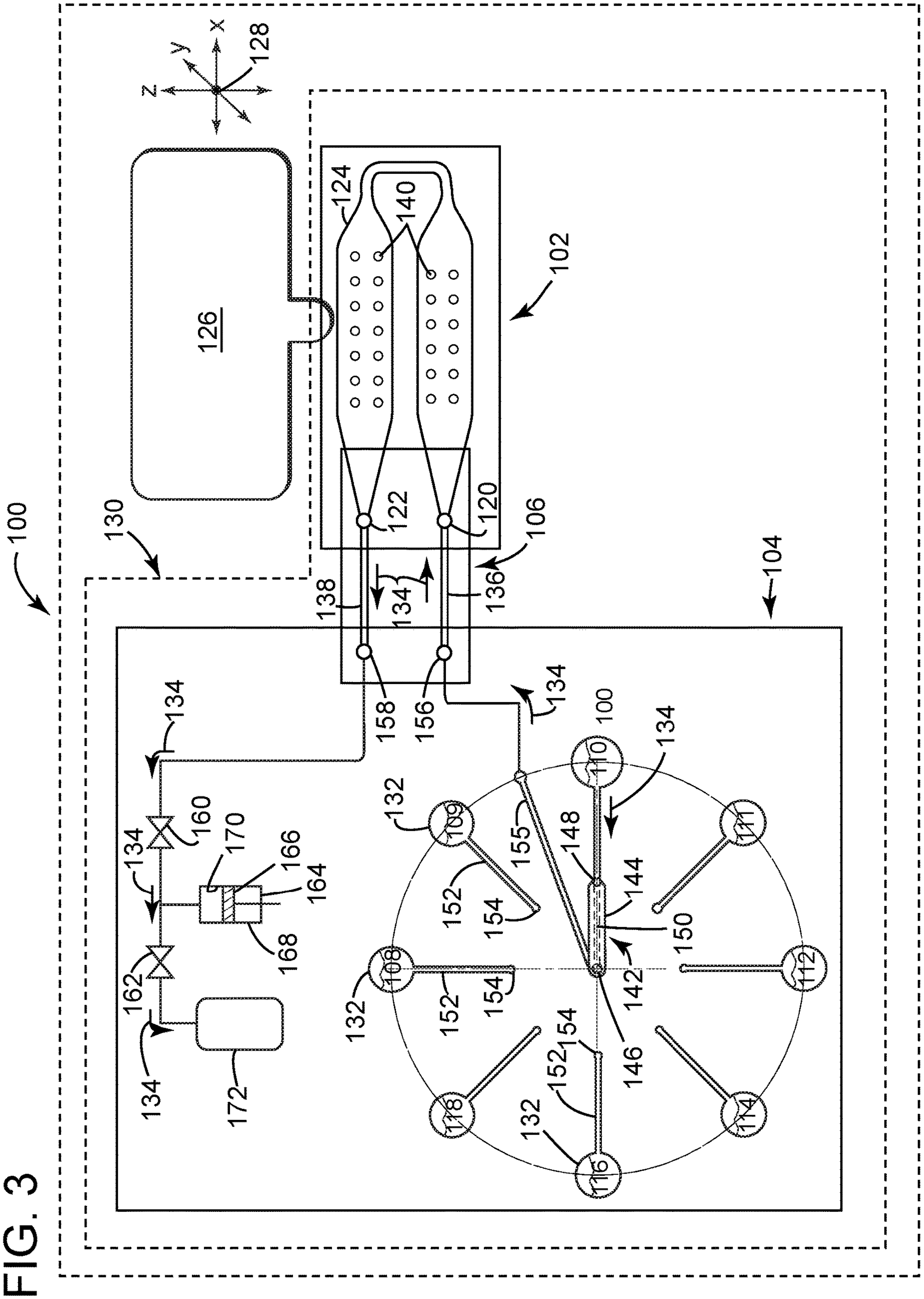
FIG. 3 depicts an example of a more detailed schematic diagram of the instrument of FIG. 2 according to aspects disclosed herein.

The flow cell 102 includes an inlet port 120 and an outlet port 122 connected therebetween by a flow channel 124 (best seen in FIG. 3). Analytes 140 (best seen in FIG. 3), such as DNA segments, nucleic-acid chains or the like, may be positioned in the flow channel 124.

The selected reagents 108-118 may flow through the flow channel 124 of the flow cell 102 and be routed over the analytes 140 in order to perform various controlled chemical reactions on the analytes with a predetermined sequence of the reagents 108-118. One example of a chemical reaction between a reagent and analytes in a flow cell is where a reagent delivers an identifiable label (such as a fluorescently labeled nucleotide molecule or the like) that may be used to tag the analytes. Thereafter, an excitation light may be radiated through the top layer of the flow cell (or any other portion of the flow cell) and to the analytes, causing the fluorescent label tagged to the analytes to fluoresce emissive light photons. The emissive light photons may be scanned and/or detected by a detection module 126 (such as an imaging module) of the instrument 100 during a detection process.

During the detection process, a detection module 126 may, or may not, be movable relative to fixed reference point on the instrument 100. For example, the detection module 126 may be moved and the flow cell 102 held fixed relative to the reference point in order to scan the flow channel 124 for the emissive light photons. Alternatively, by way of example, the detection module 126 may be held fixed and the flow cell 102 moved relative to the instrument's reference point in order to scan the flow channel 124 of the flow cell 102.

Device circuitry within the instrument 100 may then process and transmit data signals derived from those detected photons. The data signals may then be analyzed to reveal properties of the analytes 140.

Though the detection module 126 has been illustrated in this example as being an imaging module used for detecting photons of light, other forms of detection modules 126 and detection schemes may be used to detect other forms of detectable properties related to the analytes 140. For example, the detectable properties related to the analytes 140 may include photons of light, electric charges, magnetic fields, electrochemical properties, pH changes or the like. Moreover, the detection module 126 may, without limitation, include sensing devices that may be either embedded in the flow cell 102, mounted in the instrument 100 external to the flow cell 100 or any combination thereof. The chemical reactions between the reagents 108-118 and the analytes 140 induce the analytes to affect the detectable properties.

For purposes herein, the term "affecting detectable properties", and its derivatives, includes causing such detectable property to initiate or change in such a way that its initiation or change is detectable by the detection module 126. For example, affecting a detectable property may include: causing fluorescent labels tagged to the analytes 140 to fluoresce emissive light photons, changing or initiating an electromagnetic field, changing a pH or the like.

The detection module 126 may be equipped with all cameras and/or sensors suitable and/or needed to detect the affected detectable properties. Alternatively, some sensors may be embedded in the flow cell itself, wherein the sensors communicate with the detection module 126.

The flexible connection 106 enables the flow cell 102 to be moved relative to a fixed reference point 128 in the instrument 100 while the detection module 126 is held stationary relative to the reference point 128 in order to detect the photons of light, or other forms of detectable properties. Alternatively, the flow cell 102 may be held stationary, and the detection module 126 moved, relative to the reference point 128 in order to detect the detectable properties. In some implementations, both the flow cell 102 and the detection module 126 can be moved relative to the reference point 128. More specifically, the flow channel 124 of the flow cell 102 is moved past the focal areas of the sensing devices and/or cameras of the detection module 126 to allow the detection module 126 to scan the flow channel 124 for photons of light, or other forms of detectable properties, related to the analytes 140.

The flow cell 102 may be moved in any of three directions (as indicated by the X, Y and Z arrows) relative to the reference point 128. Additionally, the flow cell 102 may be moved such that it may be rotated in anyone or any combination of the axes (i.e., X, Y, and Z) as rotational axes. In this example, the flow cell 102 may be moved with 6 degrees of freedom in three dimensional space (i.e., any combination of linear movement in the X, Y and Z directions plus any combination of rotational movement about the X, Y, Z axes). It is important to note, however, that regardless of which direction the flow cell 102 is moved in, the flow cell 102 may be able to be positioned in each of those three directions (i.e., in the X direction, the Y direction or the Z direction) relative to the reference point 128 within a precise tolerance range, for example, within plus or minus 100 microns or less.

The reference point 128 may be anyone or any number of stationary structures on the instrument 100. For example, the reference point 128 may be one or more mechanical registration holes or protrusions located throughout the instrument 100. Further the reference point 128 may include separate or multiple reference points that one or more of the RMS 104, flow cell 102 and/or detection module 126 are aligned or positioned to, wherein those separate reference points 128 may be aligned to a common reference point.

For purposes herein, various reference points 128 or groups of reference points 128 may be referred to as one or more registration systems. Additionally, the positioning or aligning of a component, such as a flow cell 102, an RMS 104 and/or a detection module 126, to a registration system may be referred to herein as registering the component.

Additionally, the flow cell 102 may be positioned indirectly to the reference point 128. For example, the detection module 126 may be positioned relative to the reference point 128 and the flow cell 102 may be positioned relative to a fixed reference point on the detection module 126. Alternatively, by way of example, the detection module 126 may be positioned relative to the reference point 128 and the detection module 126 may then be utilized to detect the relative position of the flow cell 102 to the detection module 126.

The flow cell 102 is moved relative to the detection module 126 in order for the detection module 126 to scan and detect light photons, or other forms of detectable properties, being affected by the analytes 140 positioned over an area of the flow channel 124. Advantageously, the flow cell 102 is at least an order of magnitude lighter and smaller than the detection module 126. Therefore, precise positioning of the flow cell 102 relative to the detection module 126 may be done with smaller handling equipment, less expensively and in less time than such positioning of a detection module 126 relative the flow cell 102. Additionally, the movement of the flow cell 102 may cause less vibration than movement of the detection module 126.

Additionally, even if the detection module 126 is mobile and the flow cell 102 is fixed relative to a reference point 128 of an instrument 100, the flexible connection 106 may advantageously reduce vibrations transmitted to the flow cell 102 by the RMS 104. This is because the flexible connection 106 separates the RMS 104 from the flow cell 102 and, therefore, may dampen any vibrations produced by the RMS 104 that may be transmitted through the flexible connection 106.

Moreover, whether the detection module 126 is movable or fixed, the flexible connection 106 advantageously enables independent registration (i.e., positioning) of the RMS 104 and flow cell 102 to separate registration systems (i.e., to separate reference points). As such, both the RMS 104 and the flow cell 102 may be more precisely registered to their associated reference points.

For example, the reference point 128 may include a first reference point for the RMS 104 and a second reference point for the flow cell 102. As such, the RMS 104 may be positioned relative to the first reference point and the flow cell 102 may be positioned relative to the second reference point. Wherein, the positioning of the RMS 104 and the flow cell 102 to their respective first and second reference points, respectively, may be independent of each other.

Figure 2:
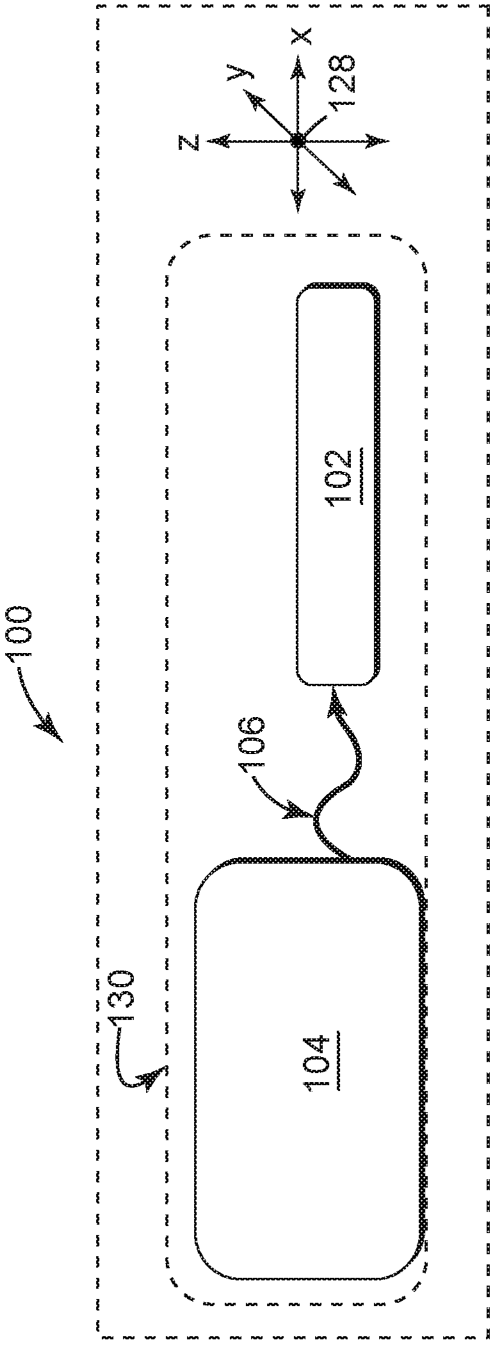
FIG. 2 depicts an example of a schematic block diagram of an instrument having a cartridge according to aspects disclosed herein.

Referring to FIG. 2, an example of a schematic block diagram of a cartridge-based instrument, wherein the instrument 100 includes a cartridge 130 according to aspects disclosed herein is depicted. The cartridge 130 includes the flow cell 102, the RMS 104 and the flexible connection 106. Further, the cartridge 130 may be detachable from the instrument 100. Still further, the flow cell 102 may, or may not, be detachable from the cartridge 130. When the cartridge 130 is engaged with the instrument 100 and the flow cell 102 is engaged with the cartridge 130, the RMS 104 is fixed relative to the reference point 128 of the instrument 100 while the flow cell 100 is movable relative to the reference point 128 of the instrument 100.

During the engagement process of the cartridge 130 to the instrument 100, the tolerance ranges of positioning requirements (i.e., registration requirements) of the RMS 104 and the flow cell 102 may be very different. More specifically, in order for the cartridge 130 to be engaged with the instrument 100, the RMS 104 may be positioned relative to the reference point 128 within about a predetermined first tolerance range. That first tolerance range may be in the millimeter range, such as plus or minus 2 millimeters or less. On the other hand when the flow cell 102 is registered relative to the detection module 126 and/or moved to a predetermined position in the instrument 100 in order to be scanned by the detection module 126, the flow cell's position may be positioned relative to the reference point 128 within about a second predetermined tolerance range. That second tolerance range may be in the micrometer range, such as plus or minus 100 microns or less. As such the first tolerance range may to be at least 10 times greater than the second tolerance range.

This is because the RMS 104 may align with certain mechanical components, such as valves and drive motors, in order to be operated by the instrument 100. On the other hand, the flow cell 102 may be more precisely positioned relative to the detection module 126 in order to be optically scanned over the surface of the flow channel 124.

If the RMS 104 were rigidly connected to the flow cell 102 (i.e., connected such that the positions of the RMS 104 and the flow cell 102 are held substantially fixed relative to each other), then both the RMS 104 and the flow cell 102 may have to be positioned within the smaller of the two tolerance ranges (i.e., the second tolerance range for the flow cell 102). However, the flexible connection 106 decouples the positioning requirements of the RMS 104 and flow cell 102. Therefore, the RMS 104 and flow cell 102 may be independently aligned to their separate positioning requirements, by permitting separable alignment to engage the cartridge 130 to the instrument 100 and to position the flow cell 102 relative to the detection module 126.

Even though the example of this FIG. 2 illustrates a cartridge-based instrument 100 having an RMS 104 and flow cell 102 contained in a cartridge 130, other instruments 100 may not include such a cartridge-based system. Rather, in some instruments 100, the components of the RMS 104 may be integrally and rigidly mounted within the instrument 100, and only the flow cell 102 may be detachable from the instrument 100. However, even in such non-cartridge-based instruments 100, the flexible connection 106 still advantageously facilitates the precise positioning of the flow cell 102 relative to a detection module 126 during a detection process.

Referring to FIG. 3, an example of a more detailed schematic diagram of the cartridge-based instrument 100 of FIG. 2 having the cartridge 130 engaged therein is depicted. The cartridge 130 includes the flow cell 102 and the RMS 104 connected with the flexible connection 106 therebetween.

The RMS includes a plurality of reagent wells 132. Each reagent well 132 is operable to contain a reagent of a plurality of reagents 108-118 positioned therein. The RMS 104 is operable to select a flow of reagent 134 from one of the plurality of reagents 108-118.

The reagents 108-118 may be any of several types or combinations of reagents depending on the type and sequence of the chemical reactions that are to be performed at the flow cell. For example, the reagents 108-118 may be of the following types:

Reagent 108 and 109 may be different formulations of an incorporation mix, which is a mixture of chemicals that incorporates fluorescently-labeled nucleotides into DNA strands.

Reagent 110 and 111 may be different formulations of a scan mix, which is a mixture of chemicals that stabilize DNA strands during a detection process.

Reagent 112 may be a cleave mix, which is a mixture of chemicals that enzymatically cleave fluorescently-labeled nucleotides from DNA strands.

Reagent 114 and 116 may be different formulations of a wash buffer, which is a mixture of wash reagents to remove the active reagents from a flow cell.

Reagent 118 may be air.

The flexible connection 106 includes a first flexible channel 136 in fluid communication with the RMS 104 through an RMS outlet port 156. The first flexible channel 136 is operable to route the flow of reagent 134 through an inlet port 120 of the flow cell 102 and into the flow channel 124. The flexible connection 106 also includes a second flexible channel 138 in fluid communication with the flow channel 124 through an outlet port 122 of the flow cell 102. The second flexible channel 138 is operable to route the flow of reagent 134 from the flow cell 102, through an RMS inlet port 158 and back into the RMS 104 after the flow of reagent 134 has passed through the flow channel 124.

Though the example in FIG. 3 illustrates a flexible connection 106 having first and second flexible channels 136, 138 to route reagents to and from the flow cell 102, other configurations of flexible connections with any number of flexible channels may also be utilized. For example, the flexible connection 106 may include a first and a second flexible connection wherein the first flexible connection has only a single flexible channel to route flow of reagent from the RMS 104 toward the flow cell 102 and the second flexible connection has only a single flexible channel to route the flow of reagent from the flow cell 102 toward the RMS 104. Also, by way of example, the flexible connection 106 may include multiple flexible channels for routing reagent flow toward the flow cell 102 and multiple flexible channels for routing reagent flow from the flow cell 102.

The flow cell 102 of the cartridge 130 includes the flow channel 124 in fluid communication with the first flexible channel 136 through the inlet port 120, and in fluid communication with the second flexible channel 138 through the outlet port 122. The flow channel 124 is operable to perform a variety of chemical reactions between the various flows of reagent 134 from the plurality of reagents 108-118 and analytes 140 positioned in the flow channel 124. The flexible connection 106 enables the flow cell 102 to be moved relative to a fixed reference point 128 in the instrument 100.

Though the example of FIG. 3 illustrates a flow cell 102 with a single inlet port 120 and a single outlet port 122, other configurations of flow cells may also be utilized. For example, the flow cell 102 may include multiple inlet ports 120 for receiving reagent flows from multiple flexible channels of the flexible connection 106. Also, by way of example, the flow cell may include multiple outlet ports 122 for routing reagent flow to multiple flexible channels of the flexible connection 106.

The fixed reference point 128 is, in this implementation, a registration hole. However, the reference point 128 may be any number of fixed structures in the instrument 100. For example, the reference point 128 may be a plurality of registration pegs or holes located at various places on a stationary frame of the instrument 100.

The cartridge 130, in this example, includes a rotary valve 142 for selecting the reagents 108-118. The rotary valve 142 has an internal rotary valve body 144. The valve body 144 includes a center port 146 and a rotatable port 148, which are connected by a rotary channel 150. The valve body 144 pivots around the center port 146 to move the rotatable port 148.

The plurality of reagent wells 132, which contain the reagents 108-118, may be disposed around the periphery of the rotary valve 142 or otherwise remote from the rotary valve 142. Each reagent well 132 is in fluid communication with a corresponding well channel 152. Each well channel 152 includes a well channel port 154 that the rotatable port 148 of the rotary valve 142 may align with in order to receive the flow of reagent 134 from any given reagent well 132.

When the rotatable port 148 aligns with one of the well channel ports 154, a flow path for a flow of reagent 134 is established that allows the flow of reagent 134 to flow from the selected well 132, through the well channel 152, through the rotary valve 142, through a common line 155 and out the RMS outlet port 156. The flow of reagent 134 then continues through the first flexible channel 136, into the inlet port 120 of the flow cell 102 and through the flow channel 124, where the selected reagent of the plurality of reagents 108-118 may react with the analytes 140.

The unreacted reagents and/or by products of the reaction may flow out the outlet port 122 of the flow cell 102 and through the second flexible channel 138. The reagent flow 134 may then re-enter the RMS 104 through the RMS inlet port 158.

The RMS inlet port 158 of the RMS 104 is in fluid communication with a first pinch valve 160. The first pinch valve 160 is in fluid communication with a second pinch valve 162. The first and second pinch valves 160, 162 include a resilient central portion that may be mechanically or pneumatically actuated to pinch off or release the flow of reagent 134 through the pinch valves 160, 162. Additionally, though pinch valves 160, 162 are illustrated in this example, other types of valves may be utilized to perform the same function. For example, the valves 160, 162 may be rotary valves.

An onboard pump 164 (such as a syringe pump, or similar) is also disposed on the RMS 104. Even though the onboard pump 164 may be other types of pumps, it will be referred to herein as the syringe pump 164. The syringe pump 164 is connected in a tee formation between the first and second pinch valves 160, 162. Both pinch valves 160, 162 are opened and closed by the instrument 100 to engage or disengage the syringe pump 164 from the flow cell 102 and/or a waste tank 170.

The syringe pump 164 includes a reciprocating plunger 166 disposed in a cylinder 168, which has a cylinder bore 170. The plunger 166 is received within the cylinder bore 170 to form a plunger-cylinder bore seal. The plunger 166 is driven by the instrument 100 to reciprocate within the cylinder bore 170 and to pump the reagents 108-118 from the reagent wells 132 to the waste tank 172.

The instrument 100 also includes the detection module 126, which is operable to detect photons of light, or other forms of detectable properties, when a chemical reaction caused by the reagents 108-118 induces the analytes 140 to affect such detectable properties. The flexible connection 106 enables the flow cell 102 to be moved relative to the fixed reference point 128 in the instrument 100 while the detection module 126 is held stationary relative to the reference point 128 in order to facilitate detection of the detectable properties.

Alternatively, the detection module 126 may be movable relative to the fixed reference point 128 while the flow cell 102 is held fixed relative to the reference point 128. As such, the flexible connection 106 may enable the flow cell 102 to be more precisely positioned relative to the reference point 128 than that of a flow cell that is rigidly connected to the RMS 104. In some implementations, the detection module 126 and the flow cell 102 may both be moveable relative to each other and/or the RMS 104.

Further, vibrations transmitted to the flow cell 102 by the RMS 104 may also be advantageously reduced even if the detection module 126 is movable and the flow cell 102 is held fixed relative to the reference point 128. This is because the flexible connection 106 separates the RMS 104 from the flow cell 102 and, therefore, may dampen the vibrations produced by the RMS 104 that may be transmitted through the flexible connection 106.

Additionally, because the flexible connection 106 decouples the RMS 104 from the flow cell 102, the flexible connection 106 enables independent registration (i.e., positioning) of the RMS 104 and flow cell 102 to separate registration systems (i.e., to separate reference points). As such, both the RMS 104 and the flow cell 102 may be more precisely registered to their associated reference points.

Though the implementation illustrated in FIG. 3 is that of an instrument 100 utilizing a rotary valve 142 that routes the various reagents 108-118 through a common line 155 and into the flow cell 102, other instruments 100 may not utilize a rotary valve 142. For example, the well channels 152 from each reagent well 132 may extend directly to one of a plurality of separate RMS outlet ports 156.

In that case, the well channels 152 may each include a valve (not shown) to control the reagent flow 134 from each reagent well 132. Additionally, the first flexible channel 136 may be a plurality of first flexible channels to each receive the corresponding flow of reagent 134 from a corresponding RMS outlet port 156. Moreover, the inlet port 120 of the flow cell 102 may be a plurality of inlet ports 120 to receive the various reagent flows 134 from each of the plurality of first flexible channels 136.

Figure 4:
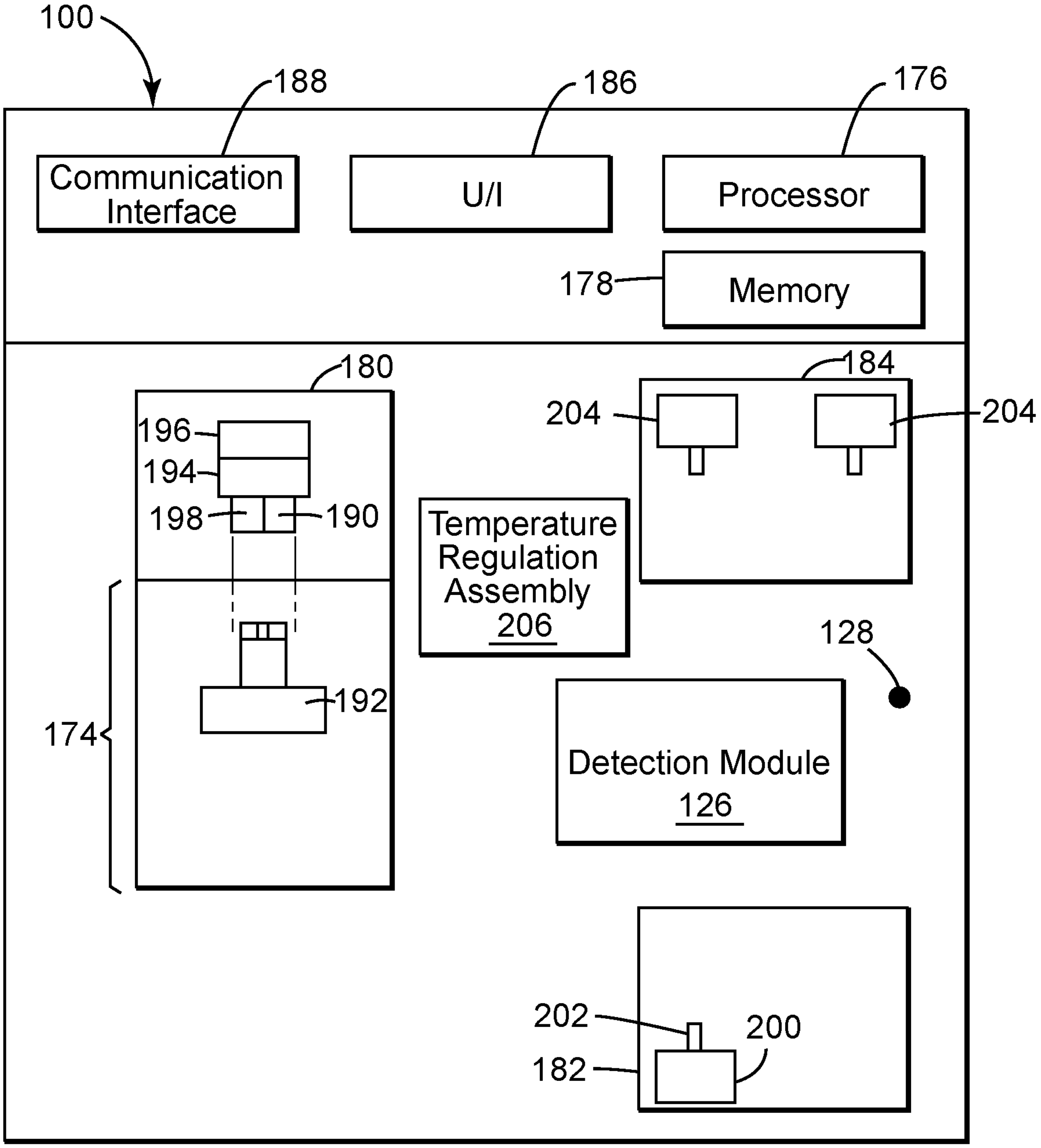
FIG. 4 depicts an example of a schematic block diagram of the instrument of FIG. 3 according to aspects disclosed herein.

Referring to FIG. 4, an example of a schematic block diagram of the instrument 100 of FIG. 3 is depicted. The instrument 100 includes a docking station 174 to receive the cartridge 130. Various electrical and mechanical assemblies within the instrument 100 interact with the cartridge 130 to operate the cartridge during a microfluidics analysis operation of the various chemical reactions that are performed in the flow cell 102.

The instrument 100 may include, among other things, one or more processors 176 that are to execute program instructions stored in a memory 178 in order to perform the microfluidics analysis operations. The processors are in electronic communication to a rotary valve drive assembly 180, a syringe pump drive assembly 182, a pinch valve drive assembly 184, the detection module 126 and a movable temperature regulation assembly 206.

A user interface 186 is provided for users to control and monitor operation of the instrument 100. A communications interface 188 can convey data and other information between the instrument 100 and remote computers, networks and the like.

The rotary valve drive assembly 180 includes a drive shaft 190, which is mechanically coupled to a rotary valve interface bracket 192. The rotary valve interface bracket 192 is selectively mechanically coupled to the rotary valve 142 of the cartridge 130. The rotary valve drive assembly 180 includes a rotation motor 194 and, in some implementations, a translation motor 196. The translation motor 196 can move the drive shaft 190 in a translational direction between an engaged state and a disengaged state with the rotary valve 142. The rotary motor 194 manages rotation of the rotary valve body 144 of the rotary valve 142.

The rotary valve drive assembly 180 also includes a position encoder 198 that monitors the position of the drive shaft 190. The encoder 198 provides position data to the processor 176.

The syringe pump drive assembly 182 includes a syringe pump motor 200 coupled to an extendable shaft 202. The shaft 202 is driven by the syringe pump motor 200 between an extended position and a retracted position to reciprocate the plunger 166 within the cylinder bore 170 of the cylinder 168 on the syringe pump 164.

The pinch valve drive assembly 184 includes a set of two pneumatically driven pinch valve drive motors 204. The two pinch valve drive motors 204 are mechanically coupled to a corresponding one of the first and second pinch valves 160, 162. The pinch valve drive motors 204 may utilize air pressure to pinch off or release a resilient central portion of the first and/or second pinch valves 160, 162 to pneumatically open and close the first and/or second pinch valves 160, 162. Alternatively, the pinch valve drive motors 204 may be electrically driven.

The detection module 126 may contain all of the cameras and/or detecting sensors suitable and/or needed to enable the detection of emissive light photons, or other forms of detectable properties, related to analytes 140 in the flow cell 102. Device circuitry (not shown) within the instrument 100 may then process and transmit data signals derived from those detected emissions. The data signals may then be analyzed to reveal properties of the analytes 140.

A temperature regulation assembly 206 (or other environmental control device) may also be included in the instrument 100. The temperature regulation assembly 206 may be utilized to provide temperature control of the flow cell 102 during the various chemical reactions. More specifically, the temperature regulation assembly 206 may provide both heating and cooling of the flow cell 102, thereby enabling thermocycling of the flow cell 102. An environmental control device may control or regulate parameters other than just temperature (e.g., pressure). As will be seen in more detail in FIGS. 5A and 5B, the temperature regulation assembly 206 may be movable relative to the reference point 128 and may provide a platform upon which the flow cell 102 maybe positioned in order to move the flow cell 102 relative to the detection module 126.

Figure 5A:
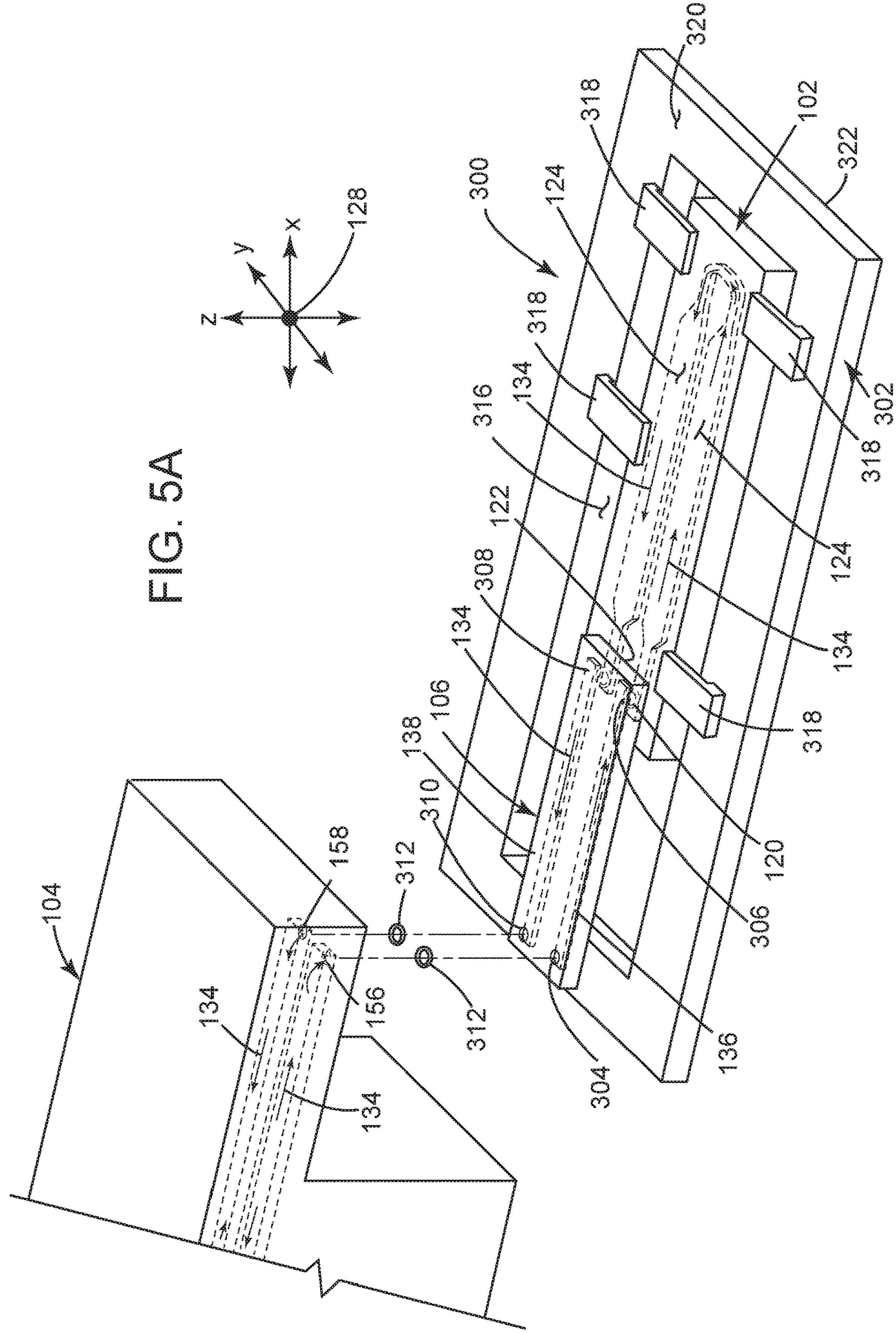
FIG. 5A depicts an example of a simplified perspective view of a flexible connection module and a portion of an RMS that the module is operable to connect to according to aspects disclosed herein.
Figure 5B:
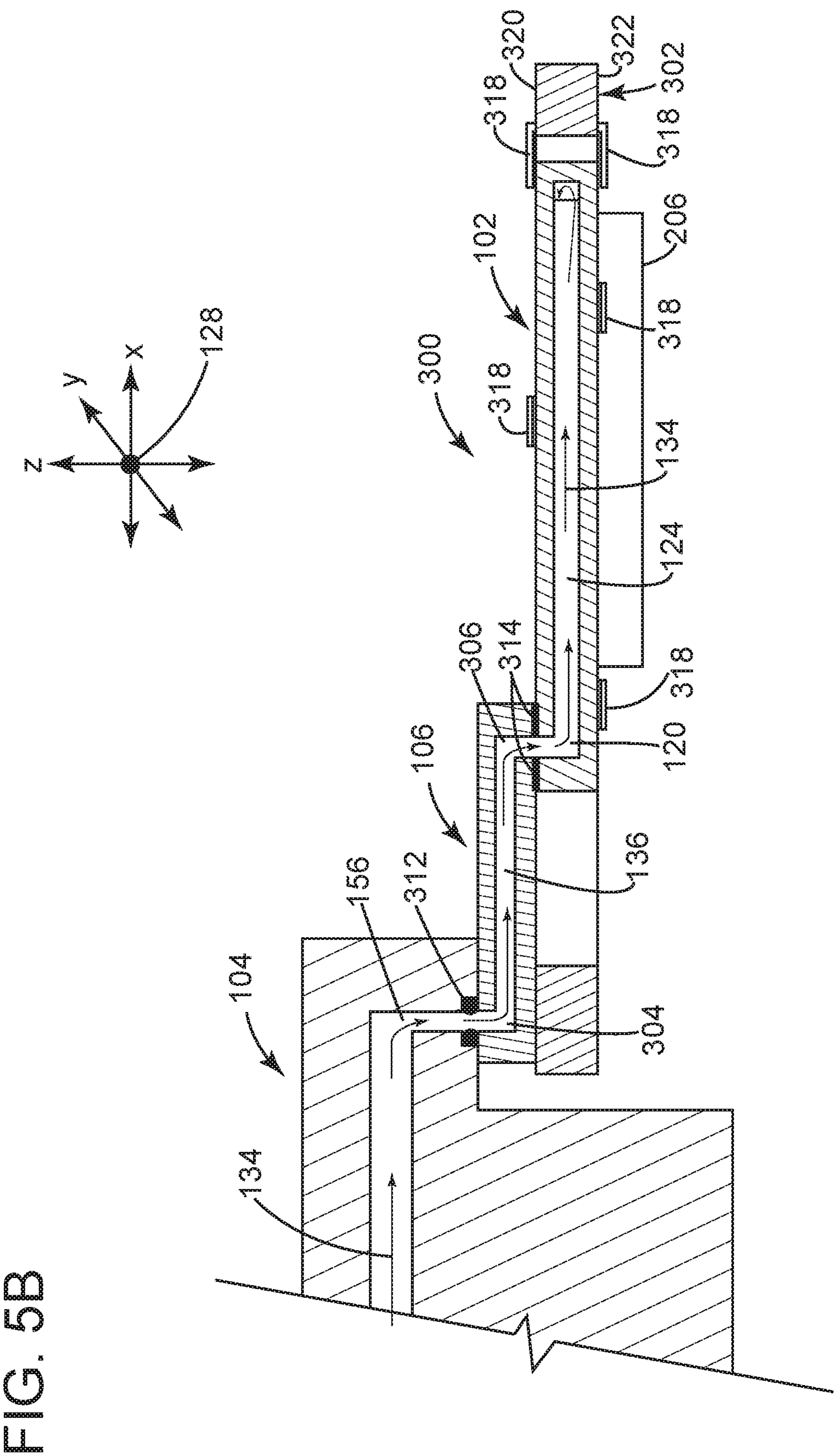
FIG. 5B depicts an example of a cross sectional side view of the flexible connection module of FIG. 5A according to aspects disclosed herein.

Referring to FIGS. 5A and 5B, an example of a flexible connection module 300 is depicted. More specifically, FIG. 5A depicts an example of a simplified perspective view of the flexible connection module 300 and a portion of the RMS 104 that the module 300 is operable to connect to. FIG. 5B depicts an example of a cross sectional side view of the flexible connection module 300 connected in fluid communication to the portion of the RMS 104, wherein the cross sectional side view is taken along the first flexible channel 136 of the flexible connection 106.

The flexible connection module 300 includes the flexible connection 106, the flow cell 102 and a support fixture 302. The flexible connection 106 is assembled in fluid communication to the flow cell 102, wherein the flexible connection 106 and flow cell 102 assembly are framed and supported by the support fixture 302. The flexible connection module 300 may be connected to the RMS 104 within the instrument 100 or the cartridge 130.

The flexible connection 106 of the flexible connection module 300 includes a first channel inlet via 304, a first channel outlet via 306 and the first flexible channel 136 in fluid communication therebetween. The first flexible channel 136 is operable to route a flow of reagent 134 from the RMS outlet port 156 of the RMS 104 to the inlet port 120 of the flow cell 102.

The flexible connection 106 also includes a second channel inlet via 308, a second channel outlet via 310 and the second flexible channel 138 in fluid communication therebetween. The second flexible channel 138 is operable to route the flow of reagent 134 from the outlet port 122 of the flow cell 102 to the RMS inlet port 158 of the RMS 104.

Both the first channel inlet via 304 and the second channel outlet via 310 can include a fluidic seal 312. The fluidic seal 312 of the first channel inlet via 304 is operable to connect to the RMS outlet port 156 of the RMS 104 and to enable the flow of reagent 134 therethrough such that the flow of reagent 134 passes from the RMS 104 to the first flexible channel 136. The fluidic seal 312 of the second channel outlet via 310 is operable to connect to the RMS inlet port 158 of the RMS 104 and to enable the flow of reagent 134 therethrough such that the flow of reagent 134 passes from the second flexible channel 138 back into the RMS 104.

The fluidic seals 312 in the implementation illustrated in FIGS. 5A and 5B are detachable O-rings. However, other forms of detachable fluidic seals 312 may be utilized. For example, various elastomeric gaskets may be used to provide a detachable fluidic seal.

Additionally, the fluidic seals 312 may not be detachably connectable to the RMS 104 of a cartridge and/or an instrument. For example, the fluidic seals 312 may be a layer of adhesive that bonds to the RMS 104, or the fluidic seals 312 may formed by a laser bond that forms a permanent bond to the RMS 104.

The flow cell 102 of the flexible connection module 300 includes the inlet port 120, the outlet port 122 and the flow channel 124 in fluid communication therebetween. The flow channel 124 is operable to route the flow of reagent 134 over analytes 140 positioned in the flow channel 124.

The first channel outlet via 306 is connected in fluid communication with the inlet port 120 of the flow cell 102. Additionally, the second channel inlet via 308 is connected in fluid communication with the outlet port 122 of the flow cell 102. The fluidic connections from the first channel outlet via 306 to the inlet port 120, and from second channel inlet via 308 to the outlet port 122, can be sealed together with an adhesive layer 314 (best seen in FIG. 5B). The adhesive layer 314 forms a permanent bond between the first channel outlet via 306 and the inlet port 120, and between the second channel inlet via 308 and the outlet port 122.

The adhesive layer 314 may be composed of several different materials that are suitable to handle the application parameters, including application temperatures, application pressures and chemical compatibility with the reagents. For example, the adhesive layer 314 may be composed of an acrylic based adhesive, a silicone based adhesive, a heat activated adhesive, a pressure activated adhesive, a light activated adhesive, an epoxy adhesive, and the like, or a combination thereof.

Alternatively, other forms of bonding may be utilized to seal the connections between the first channel outlet via 306 and the inlet port 120, and between the second channel inlet via 308 and the outlet port 122. For example, vias and ports may be laser bonded together. Further, vias and ports may be detachably connected with a detachable fluidic seal, such as with an O-ring or an elastomeric gasket.

Though the implementation shown in FIGS. 5A and 5B illustrates a flexible connection 106 having a first channel inlet via 304, a first channel outlet via 306, a second channel inlet via 308 and a second channel outlet via 310, other configurations of flexible connections having any number of channels with any number of inlet and/or outlet vias may also be utilized. For example, the flexible connection 106 may be utilized for only reagent flow into the flow cell 102, wherein the flexible connection 106 may have only one inlet via from the RMS 104 with multiple flexible channels fanning out from the single inlet via to multiple outlet vias to the flow cell 102. Alternatively, the flexible connection 106 may be utilized for only reagent flow into the flow cell 102, wherein the flexible connection 106 may have a plurality of flexible channels, each flexible channel having a single inlet via from the RMS 104 and a single outlet via to the flow cell 102. Alternatively, the flexible connection 106 may be utilized for only reagent flow from the flow cell 102 into the RMS 104, wherein the flexible connection may have only one inlet via from the flow cell 102 with multiple flexible channels fanning out from the single inlet via to multiple outlet vias to the RMS 104. The flexible connection 106 may be utilized for only reagent flow from the flow cell 102 into the RMS 104, wherein the flexible connection 106 may have a plurality of flexible channels, each flexible channel having a single inlet via from the flow cell 102 and a single outlet via to the RMS 104. In still further implementations, the flexible connection 106 may be utilized for both of reagent flow into the flow cell 102 and out of the flow cell 102 from the same end or opposite ends of the flow cell 102. The flexible connection 106 can include in such an implementation can include only one inlet via with multiple flexible channels fanning out from the single inlet via to multiple outlet vias or may include a plurality of flexible channels, each flexible channel having a single inlet via and a single outlet via. Further flexible connection 106 configurations may include a first flexible connection for reagent flow into the flow cell 102 and a second flexible connection for reagent flow out of the flow cell 102, wherein both the first and second flexible connections may include various configurations of inlet vias, outlet vias and flexible channels connected therebetween.

The support fixture 302 of the flexible connection module 300 includes an inner border 316 that surrounds the flow cell 102. The support fixture 302 is operable to contain the flow cell 102 within the inner border 316. The support fixture 302 may enable the flow cell 102 to move laterally in the Y direction and longitudinally in the X direction within the support fixture 302. Additionally, the support fixture 302 may also allow movement of the flow cell 102 vertically in the Z direction relative to the support fixture 302.

One way the support fixture 302 may provide such movement in the X, Y and Z directions while containing the flow cell 102 within the inner border 316 is with a plurality of support fingers 318 disposed on the upper surface 320 and/or lower surface 322 of the support fixture 302. The support fingers 318 may extend inwardly from the inner border 316 and partially across the top and/or bottom surfaces of the flow cell 102. For the support fingers 318 disposed on the upper surface 320, such support fingers 318 may be sized such that they do not extend over the flow channel 124 of the flow cell 102 in order to not interfere with the detection module 126 over the flow channel 124 during a detection process. The support fingers 318 may prevent the flow cell 102 and flexible connection 106 from substantial displacement or complete removal from within the inner border 316 of the support fixture 302 during shipment of the flexible connection module 300 and/or during operation of the instrument 100.

Additionally, the support fingers 318 may allow movement of the flow cell 102 both laterally (Y direction) and longitudinally (X direction) within the inner border 316. In some implementations, the support fingers 318 may be disposed on the bottom surface 322 of the support fixture 302 and the support fingers 318 may be disposed on the top surface 320 of the support fixture 302 and may be spaced apart to allow a predetermined amount of movement of the flow cell 102 in the vertical (Z) direction while still retaining the flow cell 102 within the inner border 316 of the support fixture 302.

Though the implementation in FIGS. 5A and 5B illustrates a support fixture 302 having support fingers 318 for retaining the flow cell 102, other configurations of support fixtures 302 may also be utilized. For example, the support fixture 302 may be designed as a carrier plate that does not include any support fingers 318 and the flow cell 102 may be bonded to the top surface of the support fixture 302. Also, even though the implementation in FIGS. 5A and 5B illustrates the support fixture 302 extending along the entire combined length of the flow cell 102 and the flexible connection 106, other configurations of the support fixture 302 may have the flexible connection 106 extending past the outer perimeter of the support fixture 302.

During operation, the flexible connection module 300 may be assembled to the RMS 104 (best seen in FIG. 5B) by aligning the fluidic seals 312 with the RMS outlet port 156 and the RMS inlet port 158. Thereafter, the support fixture 302 may be clamped to the RMS 104 such that the fluidic seals 312 are sandwiched between the support fixture 302 and the RMS 104. This may be accomplished with any number of clamping techniques, such as by bolting, or by using C-clamps or various other forms of clamping devices. In still other implementations, the fluidic seals 312 and flexible connection module 300 can be attached through other attachment components, such as snap-in connectors, etc. Such attachment may be independent of the support fixture 302.

In the implementation shown, once the RMS 104 is in fluid communication with the flexible connection module 300, the flow cell 102 may be engaged with the movable temperature regulation assembly 206 (best seen in FIG. 5B). In some implementations, the support fingers 318 may be disposed on the lower surface 322 of the support fixture 302 to only extend partially across the bottom surface of the flow cell 102 to permit the engagement of the flow cell 102 with the moveable temperature regulation assembly 206. As such enough of the bottom surface of the flow cell 102 can be exposed to a surface of the temperature regulation assembly 206 to be engaged with the flow cell 102. Such an engagement may allow for longitudinal and lateral movement of the flow cell 102 within the inner border 316 of the support fixture 302 while engaged with the temperature regulation assembly 206.

The temperature regulation assembly 206 can be operable to position the flow cell 102 within a few microns relative to a position of the detection module 126 in the vertical (i.e., Z) direction. Additionally, the temperature regulation assembly 206 may move the flow cell 102 in one or both the X and/or Y directions to enable the detection module 126 to scan the flow channel 124 of the flow cell 102 during a detection process.

Alternatively, even if the detection module 126 is moved and the flow cell 102 is held fixed relative to the reference point 128 during a scan of the flow cell 102, the temperature regulation assembly 206 may still precisely position the flow cell 102 relative to the detection module 126 prior to initiating the scan. This is because the flexible connection 106 decouples some movement of the flow cell 102 from movement of the RMS 104. As such, an initial starting position of the flow cell 102 relative to the detection module 126 prior to a scan may be precisely maintained by moving the flow cell 102. If the flow cell 102 did not connect to a flexible connection 106 and was rigidly connected to the RMS 104, then both the flow cell 102 and/or portions of the RMS 104 may have to be moved, making such precise positioning of the flow cell 102 relative to the detection module 126 more difficult.

Additionally, whether the detection module 126 is movable or fixed relative to a reference point, the flexible connection 106 decouples the RMS 104 from the flow cell 102. Therefore, the flexible connection 106 enables independent registration (i.e., positioning) of the RMS 104 and flow cell 102 to separate registration systems (i.e., to separate reference points). As such, both the RMS 104 and the flow cell 102 may be more precisely registered to their associated reference points.

Figure 6:
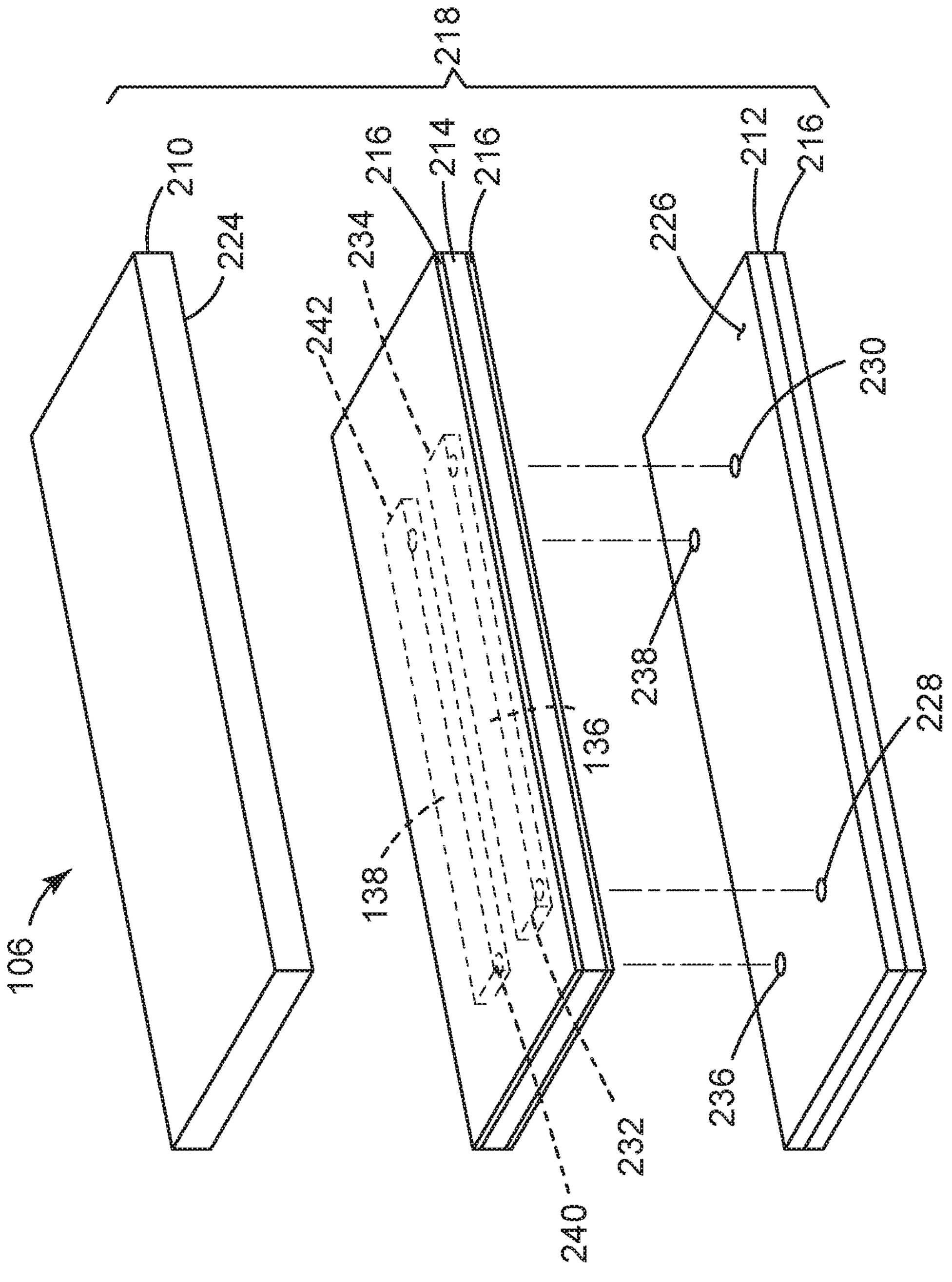
FIG. 6 depicts an example of an exploded view of a flexible connection having a top layer, a bottom layer and an intermediate layer according to aspects disclosed herein.

Referring to FIG. 6, an example of an exploded view of the flexible connection 106 having a top layer 210, a bottom layer 212 and an intermediate layer 214 is depicted. The top layer 210, bottom layer 212, and intermediate layer 214 are bonded together using an adhesive 216 to form a laminated stack or laminate 218.

The first and second flexible channels 136, 138 are cut into the intermediate layer 214 using, for example, a laser cutting process. Accordingly, the intermediate layer 214 defines a geometry of the flexible channels 136, 138. More specifically the intermediate layer 214 defines a wall width 220 and a channel width 222 (best seen in FIGS. 7A and 7B) of the first and second flexible channels 136, 138.

The top layer 210 defines a top 224 (best seen in FIGS. 7A and 7B) of the first and second flexible channels 136, 138. The bottom layer defines a bottom 226 (best seen in FIGS. 7A and 7B) of the first and second flexible channels 136, 138.

A first via 228 and a second via 230 are positioned in the bottom layer 212 of the flexible connection 106. The first and second vias 228, 230 are in fluid communication with first proximal end 232 and a first distal end 234 of the first flexible channel 136 in the intermediate layer 214. Additionally, a third via 236 and a fourth via 238 are positioned in the bottom layer 212 of the flexible connection 106. The third and fourth vias 236, 238 are in fluid communication with a second proximal end 240 and a distal end 242 of the second flexible channel 138 in the intermediate layer 214. Though the first, second, third, and fourth vias 228, 230, 236, 238 are illustrated in FIG. 6 as being disposed in the bottom layer 212, one or more may instead be positioned in the top layer 210 and/or in both the top layer 210 and bottom layer 212. More specifically, the first via 228 and third via 236 may be positioned together in either the bottom layer 212 or top layer 210. Additionally, the second via 230 and fourth via 240 also may be positioned together in either the bottom layer 212 or top layer 210.

The first via 228 can be bonded to the RMS outlet port 156 of the RMS 104 to route the flow of reagent 134 from the RMS 104 to the first flexible channel 136 (and therefore, the first via 228 may be considered an inlet via of the first flexible channel 136). The second via 230 can be bonded to the inlet port 120 of the flow cell 102 to route the flow of reagent 134 from the first flexible channel 136 to the flow channel 124 (and therefore, the second via 230 may be considered an outlet via of the first flexible channel 136). The fourth via 238 can be bonded to the outlet port 122 of the flow cell 102 to route the flow of reagent 134 from the flow cell 102 to the second flexible channel 138 (and therefore, the fourth via 238 may be considered an inlet via of the second flexible channel 138). The third via 236 can be bonded to the RMS inlet port 158 of the RMS 104 to route the flow of reagent 134 from the second flexible channel 138 back into the RMS 104 (and therefore, the third via 236 may be considered an outlet via of the second flexible channel 138).

The top layer 210, bottom layer 212, and intermediate layer 214 may be composed of several different materials that are suitable to handle the application parameters, including application temperatures, application pressures and chemical compatibility with the reagents. For example, the top layer 210, bottom layer 212, and intermediate layer 214 may be composed of polyethylene terephthalate, polyimide, cyclic olefin copolymer, polycarbonate, polypropylene and the like.

Additionally, an additive of carbon black may be added to such materials as polyethylene terephthalate to provide a black polyethylene terephthalate or similar. The materials where the carbon black additive is added may have a relatively lower auto-florescence characteristic. Further, the carbon black additive may facilitate laser bonding of the top layer 210, bottom layer 212, and intermediate layer 214.

The adhesive 216 may be composed of several different materials that are suitable to handle the application parameters, including application temperatures, application pressures and chemical compatibility with the reagents. For example, the adhesive 216 may be composed of an acrylic based adhesive, a silicone based adhesive, a heat activated adhesive, a pressure activated adhesive, a light activated adhesive, an epoxy adhesive, and the like, or a combination thereof. Such adhesives 216 may be utilized to adhesive bond the top layer 210, bottom layer 212, and intermediate layer 214 together.

In addition to the top layer 210, bottom layer 212, and intermediate layer 214 being adhesively bonded together with an adhesive (216), the top layer 210, bottom layer 212, and intermediate layer 214 may be bonded together in other ways as well. For example, the top layer 210, bottom layer 212, and intermediate layer 214 may be bonded together using direct bonding techniques, such as thermal (fusion) bonding or laser bonding. Additionally, the top layer 210, bottom layer 212, and intermediate layer 214 may be bonded together utilizing any combination of adhesive bonding or direct bonding techniques.

Additionally, with regards to adhesive bonding or direct bonding techniques, surface treatments of the top layer 210, bottom layer 212, and intermediate layer 214 may be utilized to enhance the strength of the various bonds. Such surface treatments may include, for example, chemical surface treatments, plasma surface treatments or the like.

One simplified manufacturing method of building the flexible connection 106 may be to start by cutting each of the top layer 210, bottom layer 212, and intermediate layer 214 to a predetermined specification using, for example, a laser cutting process. The method may continue by aligning the top layer 210, bottom layer 212, and intermediate layer 214 together and bonding them with manual pressure only just to get the layers to stick together and form the laminate 218. Thereafter, the laminate 218 may be put through a laminator to activate the adhesive 216 by applying a predetermined pressure. Thereafter the laminate 218 may be heated to a predetermined temperature (for example, above about 50 degrees C. or above about 90 degrees C.) for a predetermined amount of time (for example, about 2 hours or more), to fully form the flexible connection 106.

Additionally, the manufacturing process may include specific steps to reduce an amount of air pockets that may get trapped between the top layer 210, bottom layer 212, and intermediate layer 214 during assembly. For example, positive pressure (for example about 100, 125, 150 psi or greater) or negative vacuum pressure (for example about −10, −12, −14 psi or less) may be applied for a predetermined amount of time to reduce the amount of air pockets that may get trapped between the top layer 210, bottom layer 212, and intermediate layer 214. This process of applying pressure to reduce trapped air pockets may, or may not, be combined with elevated temperatures (or example above about 50 degrees C. or above about 90 degrees C.).

Thereafter, a bottom liner (not shown) that can be disposed over the adhesive 216 of the bottom layer 212 is removed to expose that adhesive 216. The flexible connection 106 is then bonded to the RMS 104 and flow cell 102 by applying an appropriate force to the flexible connection 106 in order to activate the adhesive 216 disposed on the bottom of the flexible connection 106.

Figure 7A:
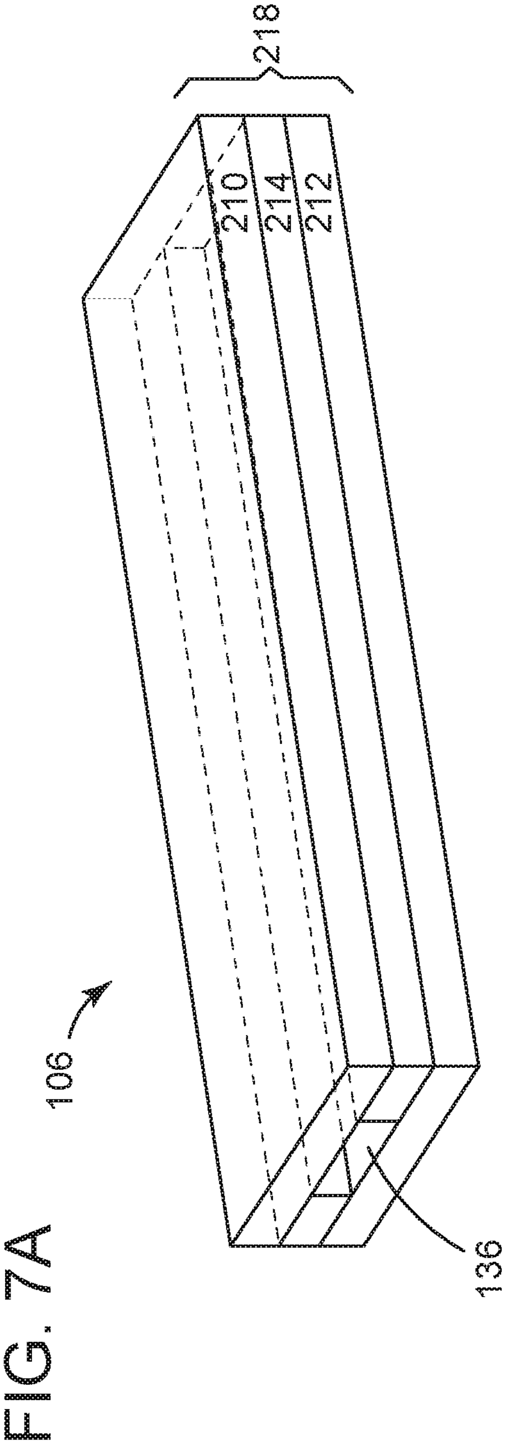
FIG. 7A depicts an example of a perspective view of the flexible connection of FIG. 6 according to aspects disclosed herein.
Figure 7B:
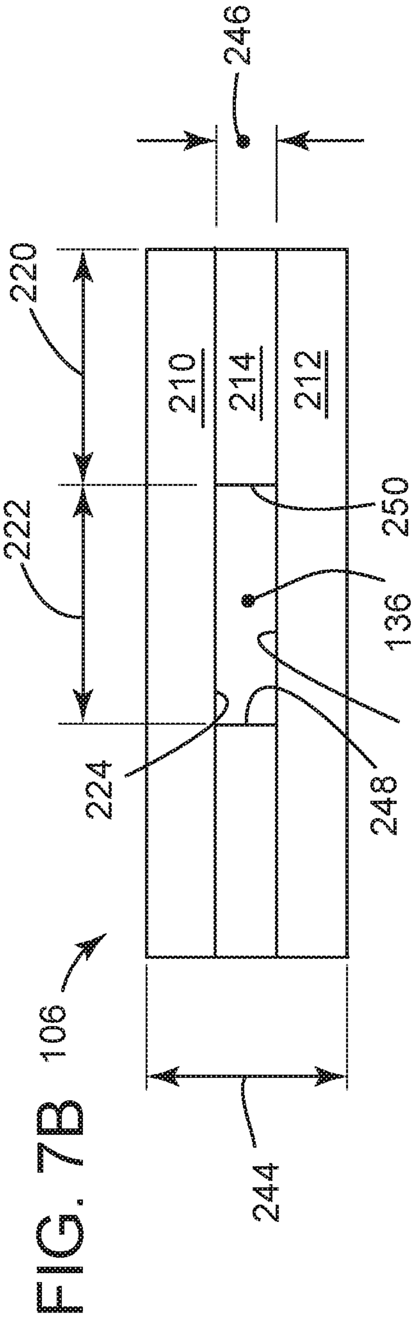
FIG. 7B depicts an example of a front side view of the flexible connection of FIG. 6 according to aspects disclosed herein.

Referring to FIGS. 7A and 7B, an example of a perspective view (FIG. 7A) and a front side view (FIG. 7B) of the flexible connection 106 of FIG. 6 is depicted. For purposes of clarity, in this particular example, only the first flexible channel 136 is illustrated.

The top layer 210, bottom layer 212, and intermediate layer 214 are bonded together to form the laminate 218. The top layer 210, bottom layer 212, and intermediate layer 214 are thin, for example, in some cases, from about 10 microns to about 1000 microns each. As such, the laminate 218 is flexible.

The laminate height (or flexible connection height) 244 may range, for example, from about 30 microns to about 3000 microns. The channel height 246 is the distance between the top 224 and bottom 226 of the first flexible channel 136. The channel height may range, for example, from about 10 microns to about 1000 microns. The channel width 222 is the distance between the two opposing inside walls 248, 250. The wall widths 220 may be any practical size depending on the design parameters. For example, the wall widths 220 may range from about 250 microns to about 650 microns. As will be discussed in greater detail in FIG. 8, the ratio of the wall width 220 to channel width 222 can be designed to be about 2.5 or greater.

Figure 8:
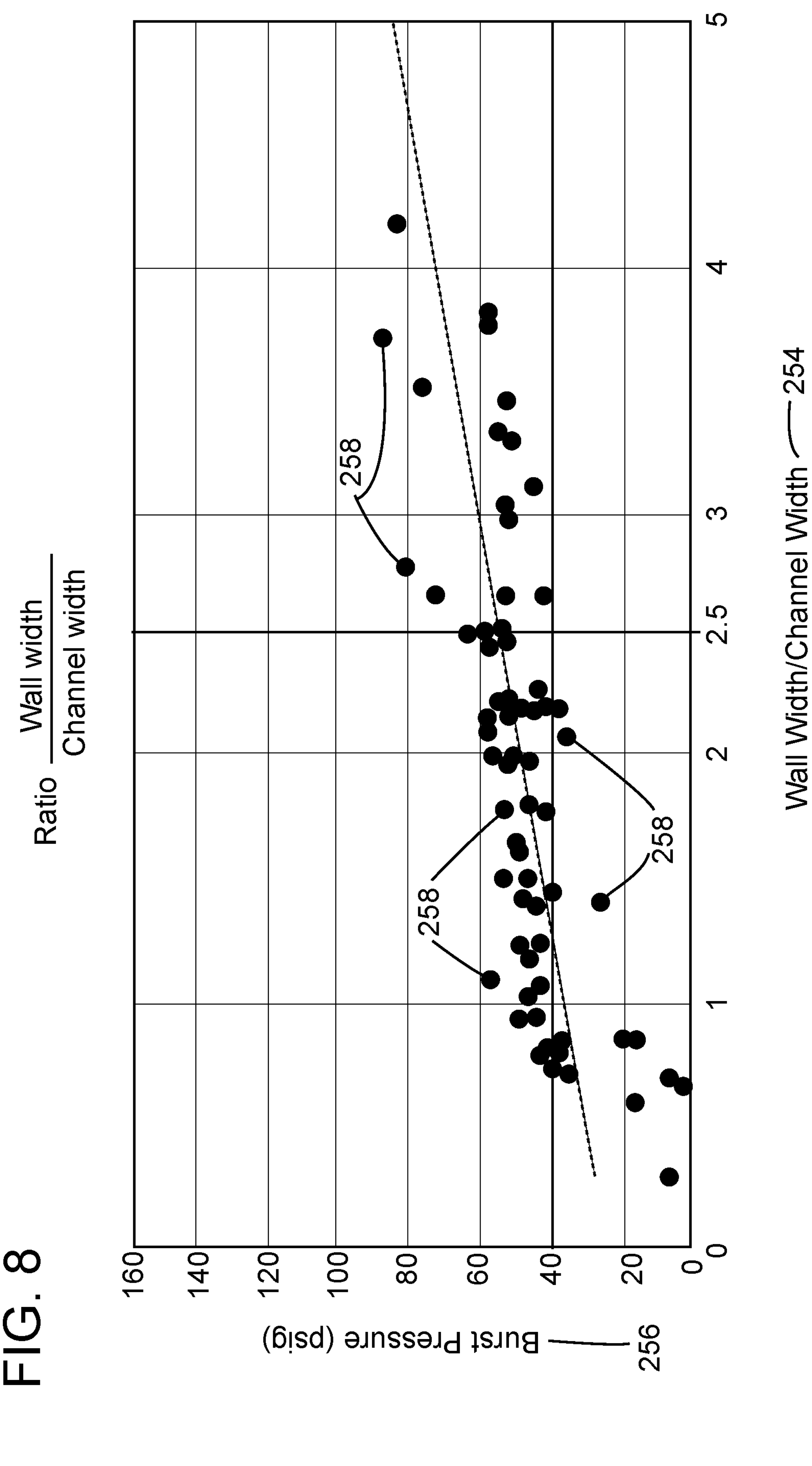
FIG. 8 depicts an example of a graph of burst pressure vs. the ratio of wall width to channel width according to aspects disclosed herein.

Referring to FIG. 8, an example of a graph 252 of burst pressure 256 vs. the ratio 254 of wall width 220 to channel width 222 is depicted. The ratio 254 of wall width 220 to channel width 222 is shown on the horizontal axis of the graph 252. The burst pressure 256 (in pounds per square inch gage (psig)) is shown on the vertical axis. Each plotted point 258 represents the intersection of the burst pressure 256 for a given ratio 254. Note that 1 pound per square inch (English units) is equal to about 0.069 bar (metric units).

The ratio 254 of wall width 220 to channel width 222 is a parameter that affects burst pressure 256 of a flexible channel (for example, the first or second flexible channels 136, 138) in the flexible connection 106. The larger the ratio 254, the higher the burst pressure 256 tends to be. Burst pressure 256, in this case, means a pressure at which leaks will develop in a flexible channel 136, 138.

The desired burst pressure 256 for an application may vary depending on application parameters. However, a burst pressure 256 of 40 psig or greater in the first and second channels 136, 138 is often adequate for most flow of reagent 134 applications. From the plotted points 258 on the graph 252, it may be seen that a ratio 254 of about 2.5 or greater may result in a burst pressure 256 of about 40 psig or greater.

Figure 9B:
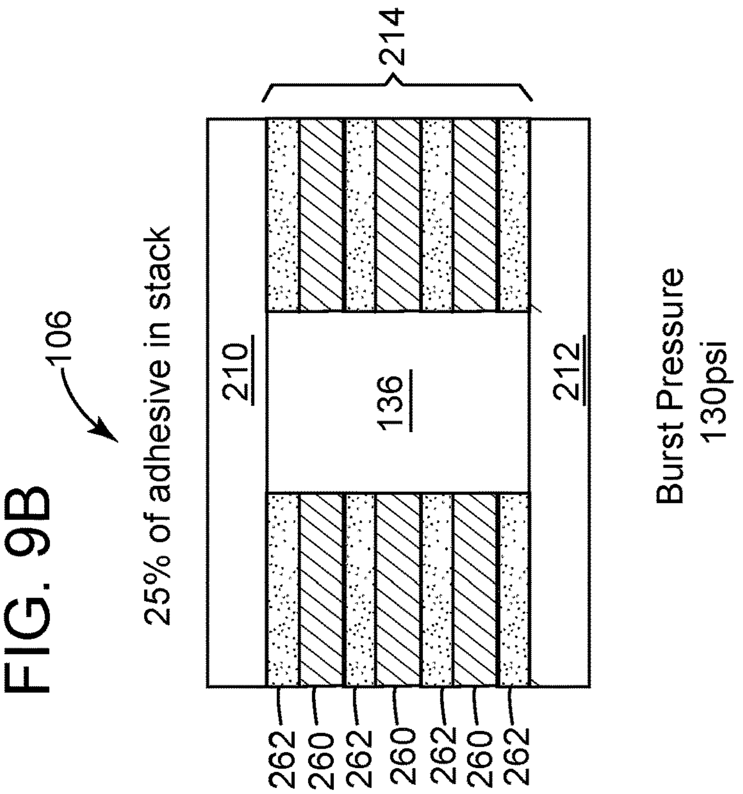
FIG. 9B depicts an example of a front side view of a flexible connection having an intermediate stack of sublayers, wherein 25 percent by volume of the sublayers is adhesive according to aspects disclosed herein.
Figure 9A:
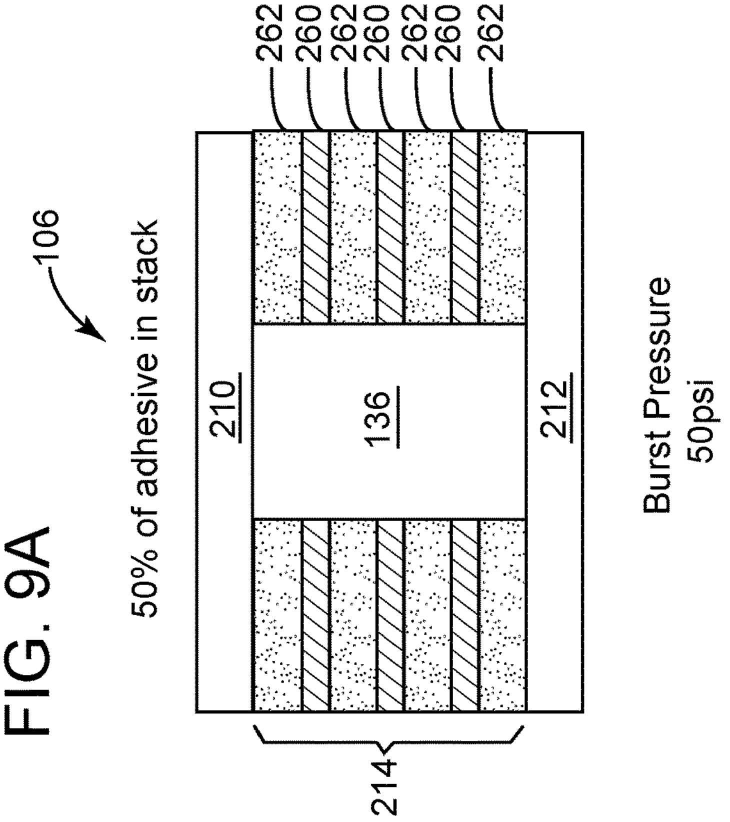
FIG. 9A depicts an example of a front side view of a flexible connection having an intermediate stack of sublayers, wherein 50 percent by volume of the sublayers is adhesive according to aspects disclosed herein.

Referring to FIG. 9A, an example of a front side view of a flexible connection having an intermediate stack of sublayers is depicted. In this FIG. 9A, 50 percent by volume of the sublayers is adhesive.

Referring to FIG. 9B, an example of a front side view of a flexible connection having an intermediate stack of sublayers is also depicted. In this FIG. 9B, 25 percent by volume of the sublayers is adhesive.

The flexible connections 106 of FIGS. 9A and 9B both include a top layer 210, a bottom layer 212 and an intermediate layer 214. However, the intermediate layer 214 is a plurality of intermediate sublayers 260 that are bonded together by an adhesive 262.

In FIG. 9A, there is about 50 percent by volume of adhesive 262 to that of the total volume of adhesive 262 plus intermediate sublayers 260, which may be composed of, for example, a polyimide. However, in FIG. 9B, there is only about 25 percent by volume of adhesive 262 to that of the total volume of adhesive 262 plus intermediate sublayers 260, which are composed of the same material (for example, polyimide).

The percentage of adhesive 262 (such as pressure sensitive adhesive) relative to a total of adhesive 262 plus intermediate sublayers 260 by volume is also a parameter that affects burst pressure. The smaller the percentage, the larger the burst pressure tends to be. In the specific case of FIGS. 9A and 9B, the only difference between the two structures of flexible connections 106 is the percentage of adhesive 262 relative to the total of the adhesive 262 and intermediate sublayers 260 by volume. In FIG. 9A, the percentage is 50 percent and the burst pressure is 50 psig. In FIG. 9B, the ratio is 25 percent and the burst pressure is 130 psig.

Figure 10:
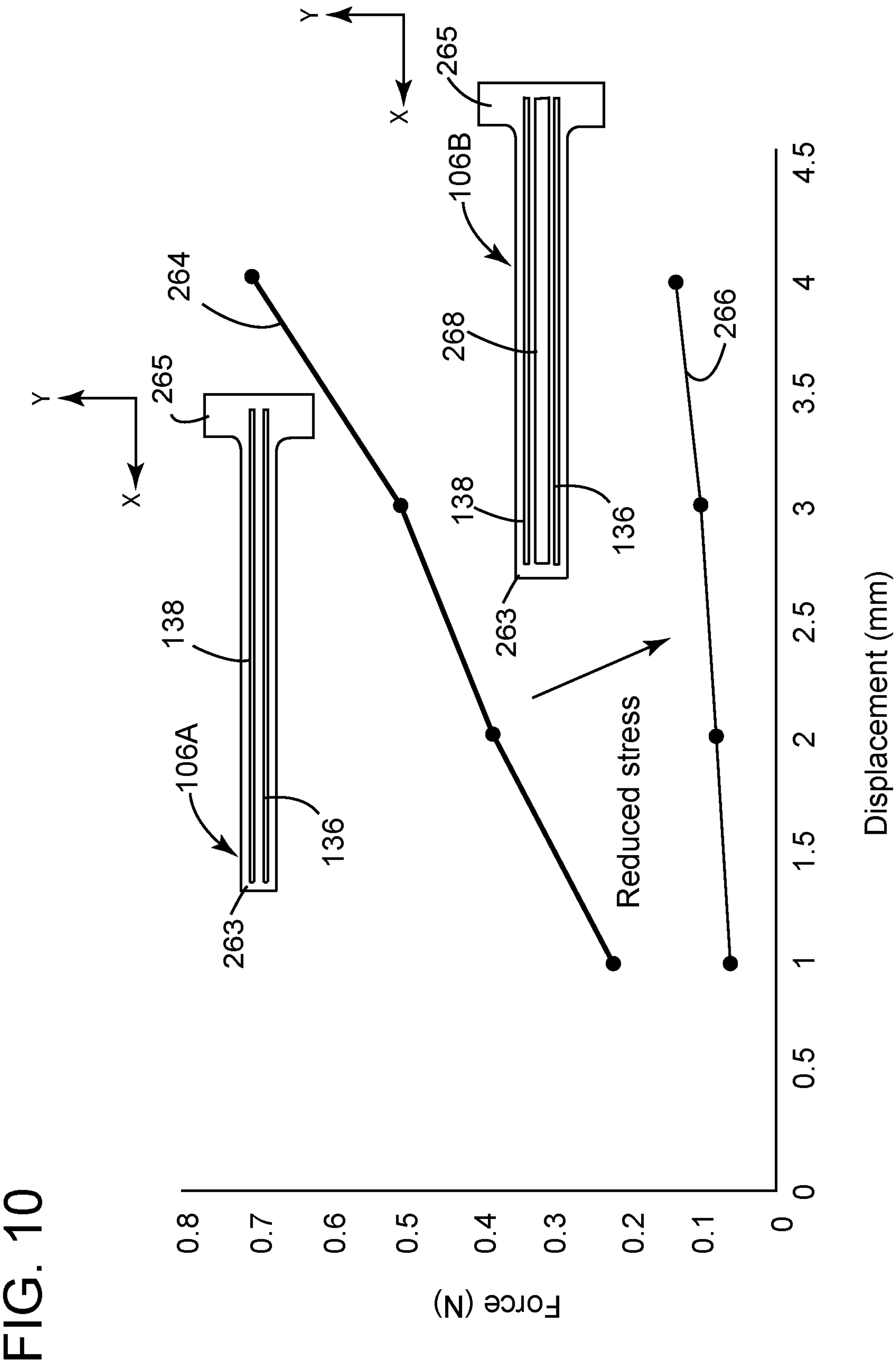
FIG. 10 depicts an example of a pair of graphs of force vs. displacement for a straight flexible connection without a slit and a straight flexible connection with a slit respectively according to aspects disclosed herein.

Referring to FIG. 10, an example of a pair of graphs 264 and 266 of force (in newtons) vs. displacement (in millimeters) for a respective pair of straight flexible connections 106A, 106B is depicted. In graph 264, the associated flexible connection 106A includes only the first and second flexible channels 136, 138 dispose therein. In graph 266, the associated flexible connection 106B includes the first and second flexible channels 136, 138, but additionally includes a slit 268 disposed between the flexible channels 136, 138.

Decoupling the reagent management system (RMS) 104 from the flow cell 102 may come at a cost of applying an additional mechanical stress to both the RMS 104 and the flow cell 102. This is because the RMS 104 and the flow cell 102 may now move with respect to each other due to the bending of the flexible connection 106. However, there are a number of ways to relieve that additional mechanical stress. One such way to reduce such stress (i.e., the force involved to move, or displace, the flow cell 102 and/or the flexible connection 106) is to position a slit 268 between the first and second flexible channels 136, 138.

As shown in a comparison of graphs 264 and 266, the slit 268 reduces the force involved to move the flexible connection 106B relative to the force involved to move the flexible connection 106A. More specifically, a first distal end 263 of the flexible connections 106A and 106B is anchored and a second distal end 265 of the flexible connections 106A and 106B is moved a predetermined distance (e.g., about 1 to 20 percent of the overall length of the flexible connection) in the X direction toward the first distal end 263. Thereafter, the second distal end 265 is moved in a direction perpendicular to the X direction (i.e., the Y direction) and the force (in newtons) needed to move a given displacement (in millimeters) in the Y direction is then measured to plot graphs 264 and 266.

The slit 268 reduces the force (as shown in graph 266) by at least about 2 times the force involved to move the flexible connection 106A without the slit 268 (as shown in graph 264). More specifically, the force applied to move the flexible connection 106A (and therefore, the flow cell 102) a distance of one millimeter is greater than 0.2 newtons without the slit 268 (see graph 264) while the force applied to move the flexible connection 106B is reduced to less than 0.1 newtons with the slit 268 (see graph 266). Additionally, the force applied to move the flexible connection 106A a distance of four millimeters is greater than 0.6 newtons without the slit 268 (see graph 264) while the force applied to move the flexible connection 106B is reduced to less than 0.2 newtons with the slit 268 (see graph 266).

Figure 11:
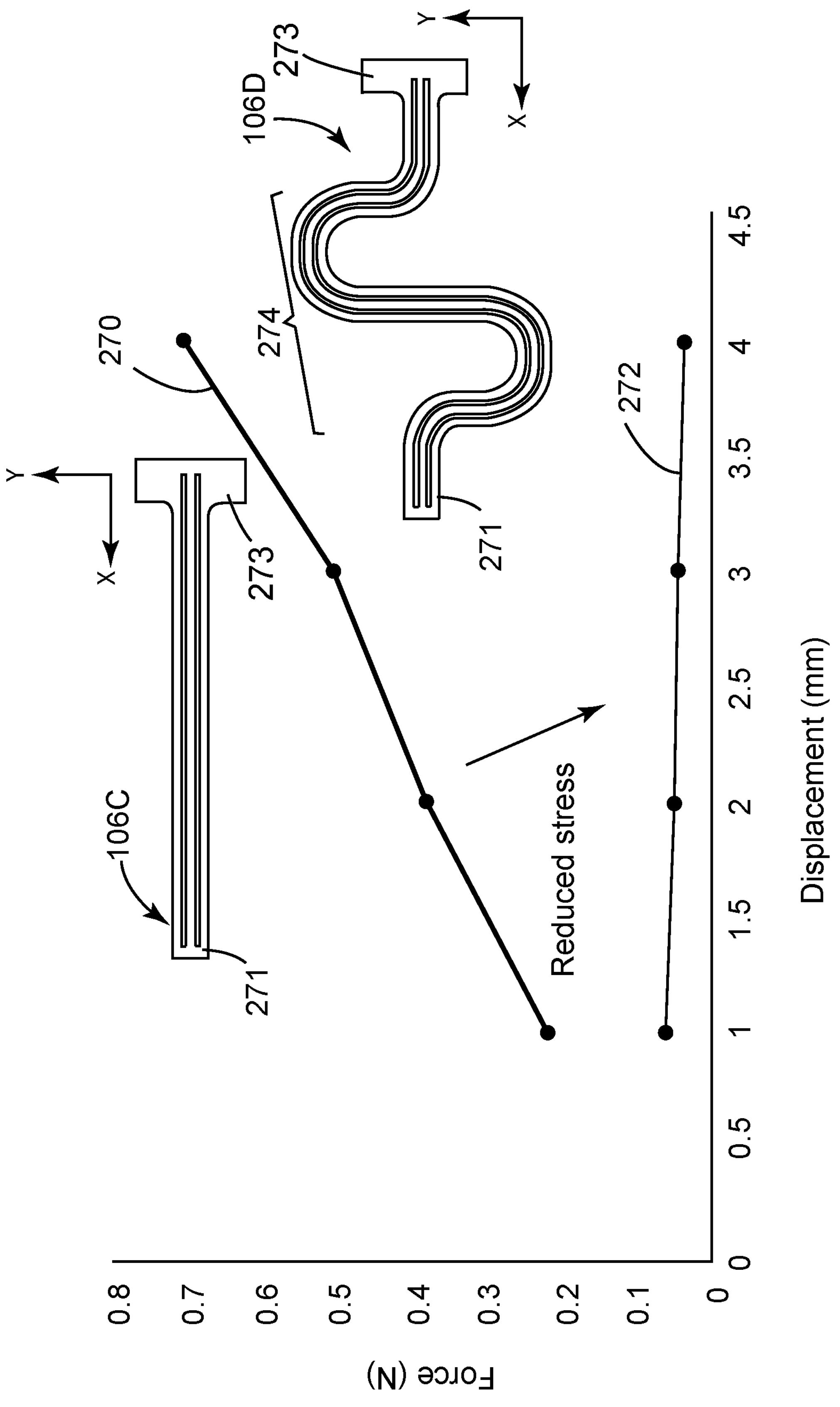
FIG. 11 depicts an example of a pair of graphs of force vs. displacement for a straight flexible connection and an S-curve flexible connection respectively according to aspects disclosed herein.

Referring to FIG. 11, an example of a pair of graphs 270, 272 of force vs. displacement for a straight flexible connection 106C (graph 270) and an S-curve flexible connection 106D (graph 272) is depicted. Another way to reduce the additional mechanical stress caused by decoupling the RMS 104 from the flow cell 102 via the flexible connection 106 is to design a sinuous shape into the flexible connection 106. In this particular example, the sinuous shape is an S-curve 274 designed into the flexible connection 106D of graph 272.

As shown in a comparison of graphs 270 and 272, the S-curve 274 reduces the force involved to move the flexible connection 106D compared to the force involved to move the flexible connection 106C. More specifically, a first distal end 271 of the flexible connections 106C and 106D is anchored and a second distal end 273 of the flexible connections 106C and 106D is moved a predetermined distance (e.g., about 1 to 20 percent of the overall length of the flexible connection) in the X direction toward the first distal end 271. Thereafter, the second distal end 273 is moved in a direction perpendicular to the X direction (i.e., the Y direction) and the force (in newtons) needed to move a given displacement (in millimeters) in the Y direction is then measured to plot graphs 270 and 272.

The S-curve 274 reduces the force (as shown in graph 272) by at least about 2 times the force involved to move the flexible connection 106C without the S-curve 274 (as shown in graph 270). More specifically, the force applied to move the flexible connection 106C (and therefore, the flow cell 102) a distance of one millimeter is greater than 0.2 newtons without the S-curve 274 (see graph 270) while the force applied to move the flexible connection 106D is reduced to less than 0.1 newtons with the S-curve 274 (see graph 272). Additionally, the force applied to move the flexible connection 106C a distance of four millimeters is greater than 0.6 newtons without the S-curve 274 (see graph 270) while the force applied to move the flexible connection 106D is reduced to less than 0.1 newtons with the S-curve (see graph 272).

Figure 12B:
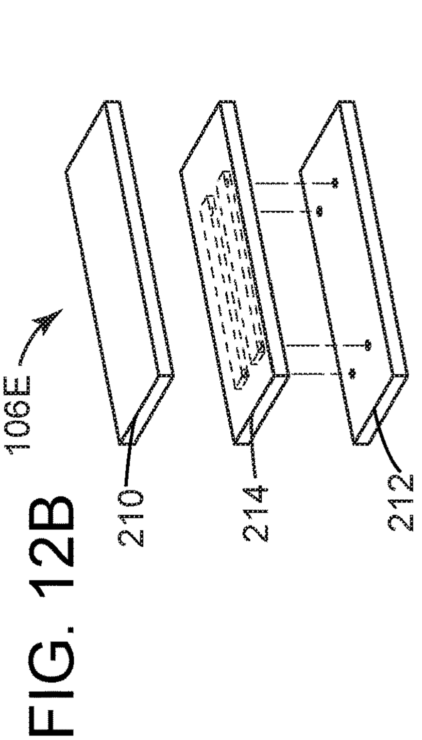
FIG. 12B depicts an exploded perspective view of the laser bonded flexible connection of FIG. 12A in accordance with aspects disclosed herein.
Figure 12C:
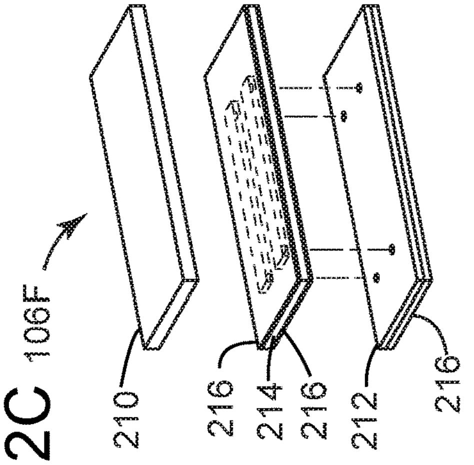
FIG. 12C depicts an exploded perspective view of the adhesive bonded flexible connection of FIG. 12A in accordance with aspects disclosed herein.
Figure 12A:
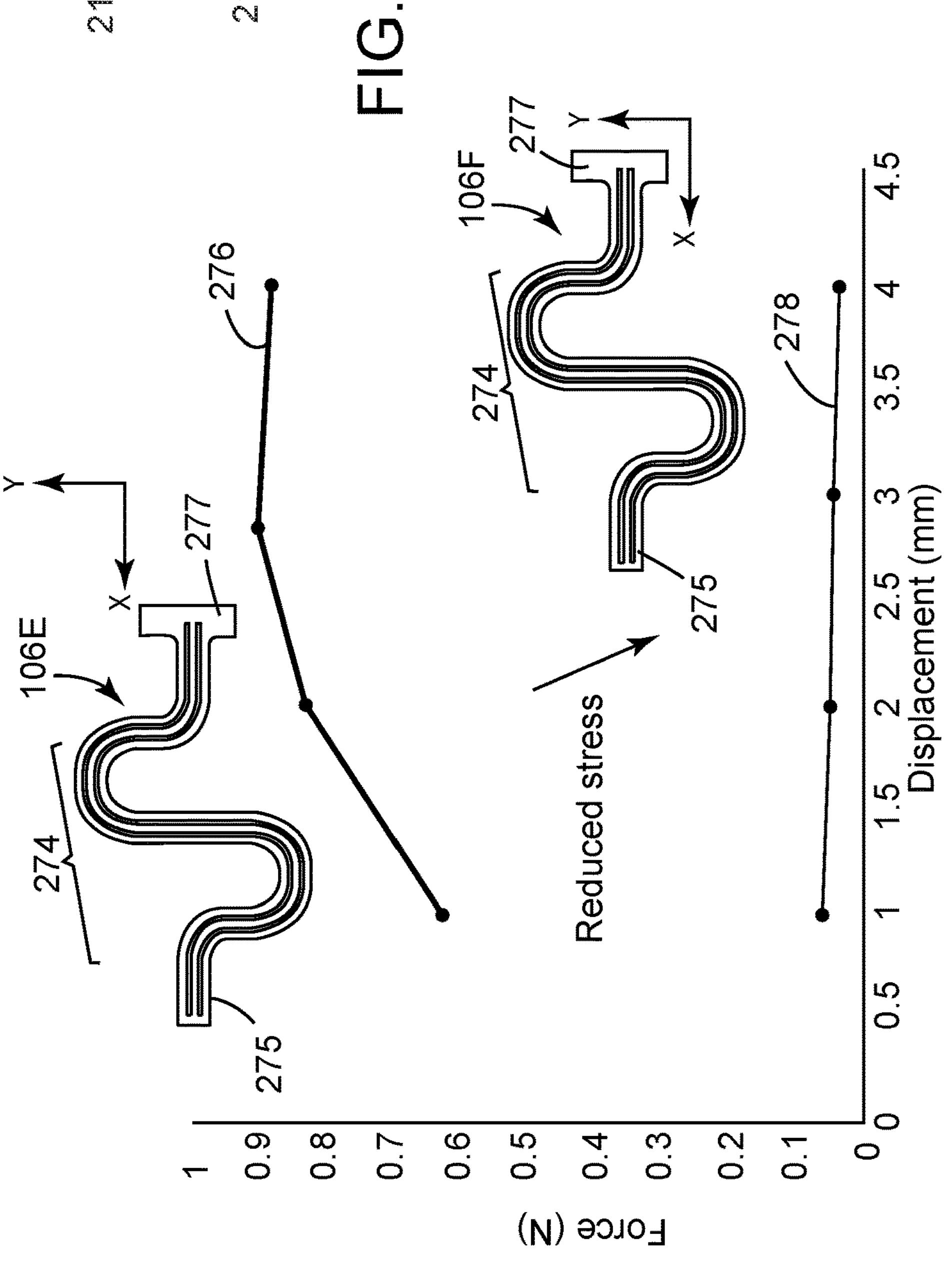
FIG. 12A depicts an example of a pair of graphs of force vs. displacement for a laser bonded flexible connection and an adhesive bonded flexible connection respectively according to aspects disclosed herein.

Referring to FIGS. 12A, 12B and 12C, an example of a pair of graphs 276, 278 of force vs. displacement for a laser bonded flexible connection 106E (graph 276 of FIG. 12A and FIG. 12B) and an adhesive bonded flexible connection 106F (graph 278 of FIG. 12A and FIG. 12C) is depicted. Both flexible connections 106E and 106F include an S-curve 274.

Another way to reduce the additional mechanical stress caused by decoupling the RMS 104 from the flow cell 102 via the flexible connection 106 is in the choice of bonding processes between the top layer 210, bottom layer 212, and intermediate layer 214. In this particular example, the only significant difference between the structures of the flexible connections 106E and 106F for each graph 276, 278 respectively is in the bonding process.

More specifically, the flexible connection 106E for graph 276 has been laser bonded. Accordingly, as illustrated in the exploded perspective view of FIG. 12B, the top layer 210, bottom layer 212 and intermediate layer 214 of flexible connection 106E are in direct contact with each other and do not include an adhesive 216 between them. In contrast, the flexible connection 106F for graph 278 has been adhesive bonded. Accordingly, as illustrated in the exploded perspective view of FIG. 12C, the top layer 210, bottom layer 212 and intermediate layer 214 of flexible connection 106F include a layer of adhesive 216 (for example a pressure sensitive adhesive) between the top layer 210, bottom layer 212, and intermediate layer 214.

As shown in a comparison of graphs 276 and 278, the adhesive bonding reduces the force involved to move the flexible connection 106F. More specifically, a first distal end 275 of the flexible connections 106E and 106F is anchored and a second distal end 277 of the flexible connections 106E and 106F is moved a predetermined distance (e.g., about 1 to 20 percent of the overall length of the flexible connection) in the X direction toward the first distal end 275. Thereafter, the second distal end 277 is moved in a direction perpendicular to the X direction (i.e., the Y direction) and the force (in newtons) needed to move a given displacement (in millimeters) in the Y direction is then measured to plot graphs 276 and 278.

The adhesive bonding reduces the force (as shown in graph 278) by at least about 6 times the force involved to move the flexible connection 106E that has been laser bonded (as shown in graph 276) compared to the force involved to move the flexible connection 106F that has been adhesive bonded. More specifically, the force applied to move the flexible connection 106E (and therefore, the flow cell 102) a distance of one millimeter is greater than 0.6 newtons when laser bonded (see graph 276) while the force applied to move the flexible connection 106F is reduced to less than 0.1 newtons when adhesive bonded (see graph 278). Additionally, the force applied to move the flexible connection 106E a distance of four millimeters is greater than 0.8 newtons when laser bonded (see graph 276) while the force applied to move the flexible connection 106F is reduced to less than 0.1 newtons when adhesive bonded (see graph 278).

Figure 13A:
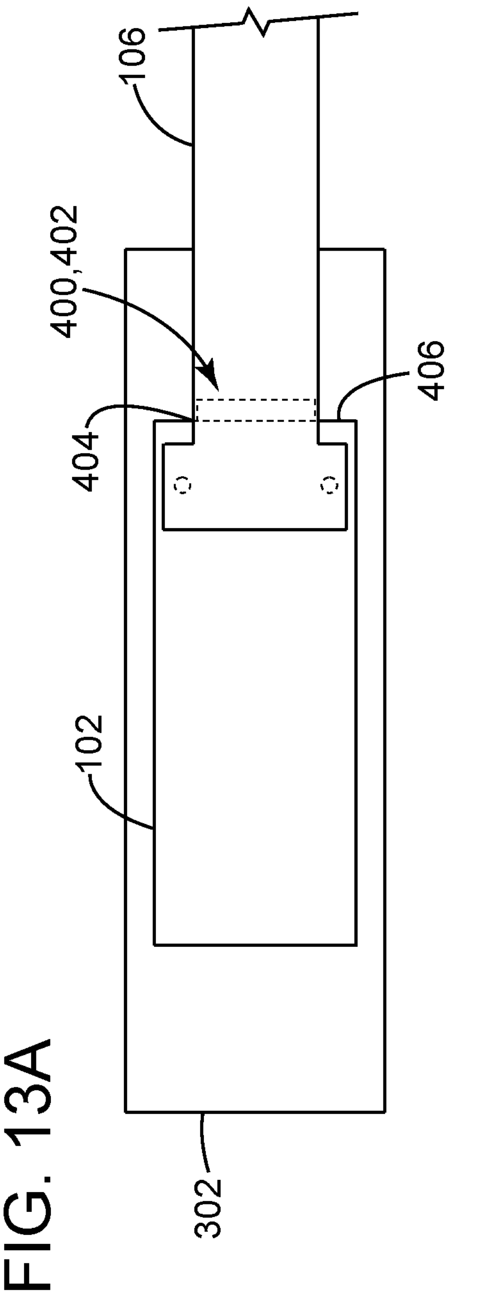
FIG. 13A depicts a top view of an example of a mechanical strain relief element fixedly coupled to a flexible connection, wherein the strain relief element is configured as an epoxy bead, in accordance with aspects disclosed herein.
Figure 13B:
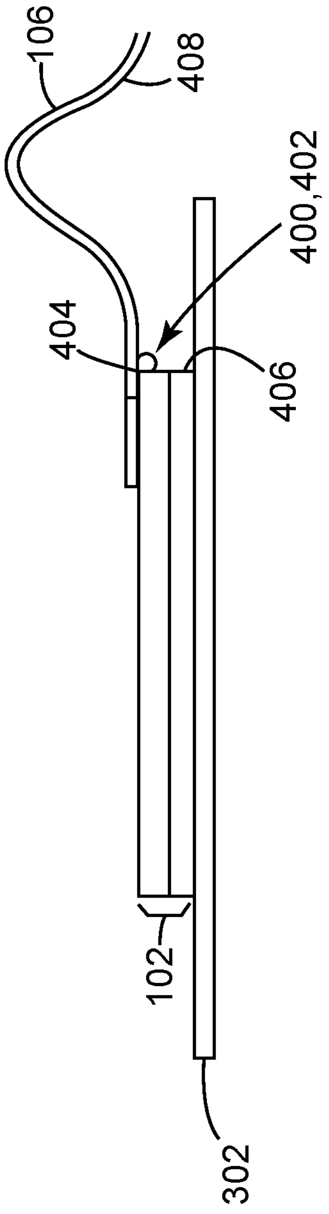
FIG. 13B depicts a side view of the example of the mechanical strain relief element of FIG. 13A in accordance with aspects disclosed herein.
Figure 13C:
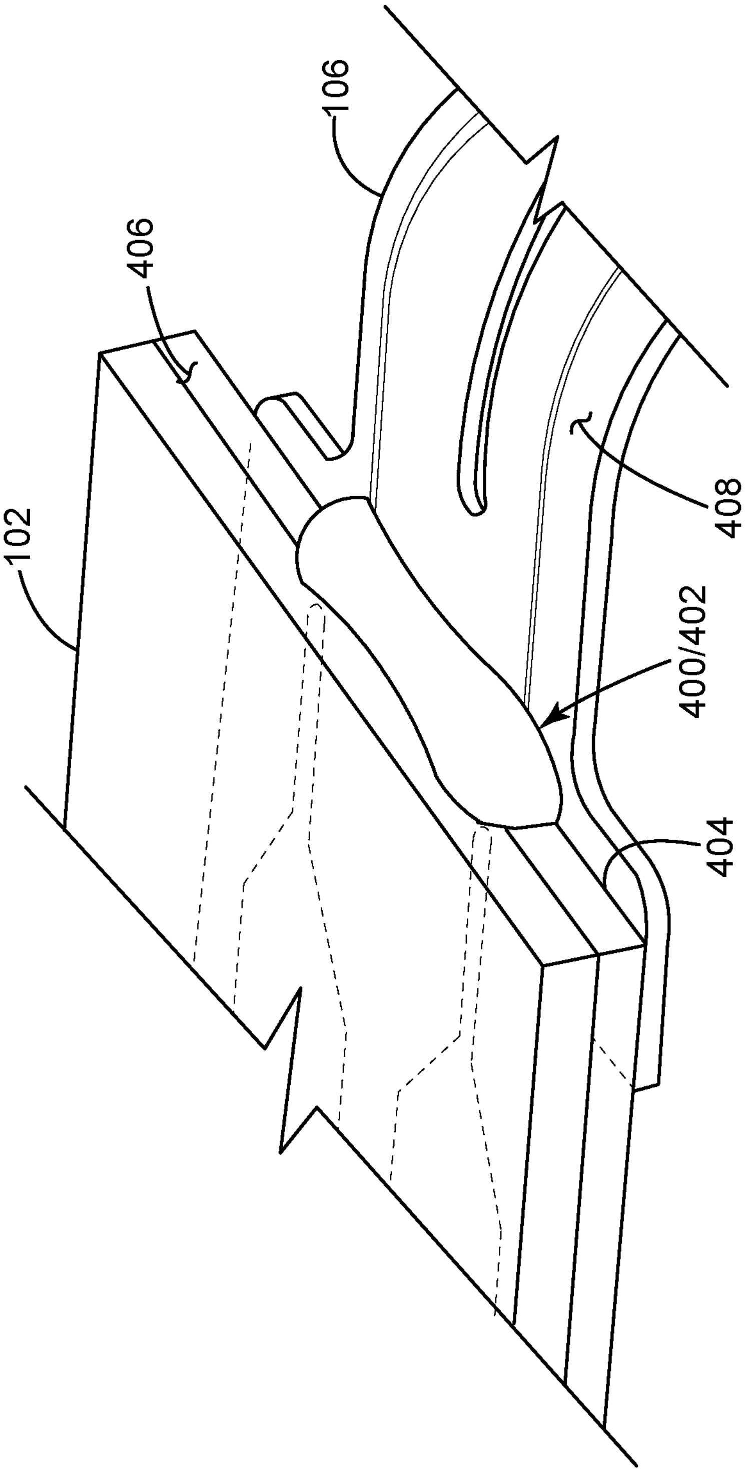
FIG. 13C depicts a perspective bottom view of the example of the mechanical strain relief element of FIG. 13A in accordance with aspects disclosed herein.

Referring to FIGS. 13A, 13B and 13C, an example of a top view (FIG. 13A), a side view (FIG. 13B) and a perspective bottom view (FIG. 13C) of a mechanical strain relief element 400 fixedly coupled to the flexible connection 106 is depicted. In the particular example illustrated in FIGS. 13A, 13B and 13C, the strain relief element 400 is configured as an epoxy bead 402.

The connection between the flexible connection 106 and the flow cell 102 may be robust enough to withstand the mechanical loads (or mechanical stress) imposed upon the flexible connection 106 during movement of the flow cell 102, as well as stress due to temperature and pressure changes. Such stress may cause the connection between the flexible connection 106 and flow cell 102 to shear if the connection is not robust enough. The strain relief element 400 may help alleviate such stress.

In the case of the epoxy bead 402 configuration of the strain relief element 400, the epoxy bead 402 is composed primarily of epoxy placed along a corner 404 where the outer perimeter 406 of the flow cell 102 and the bottom surface 408 of the flexible connection 106 join. In this configuration of strain relief element 400, at least some of the stress forces applied to the flexible connection 106 are redirected into the body of the flow cell 102 through the epoxy bead 402.

Any number of epoxies may be used so long as they have enough surface tension to form a free standing bead. For example, the epoxy bead 402 may include acrylic or silicone based adhesives or may be a two-part UV cured epoxy.

Figure 14A:
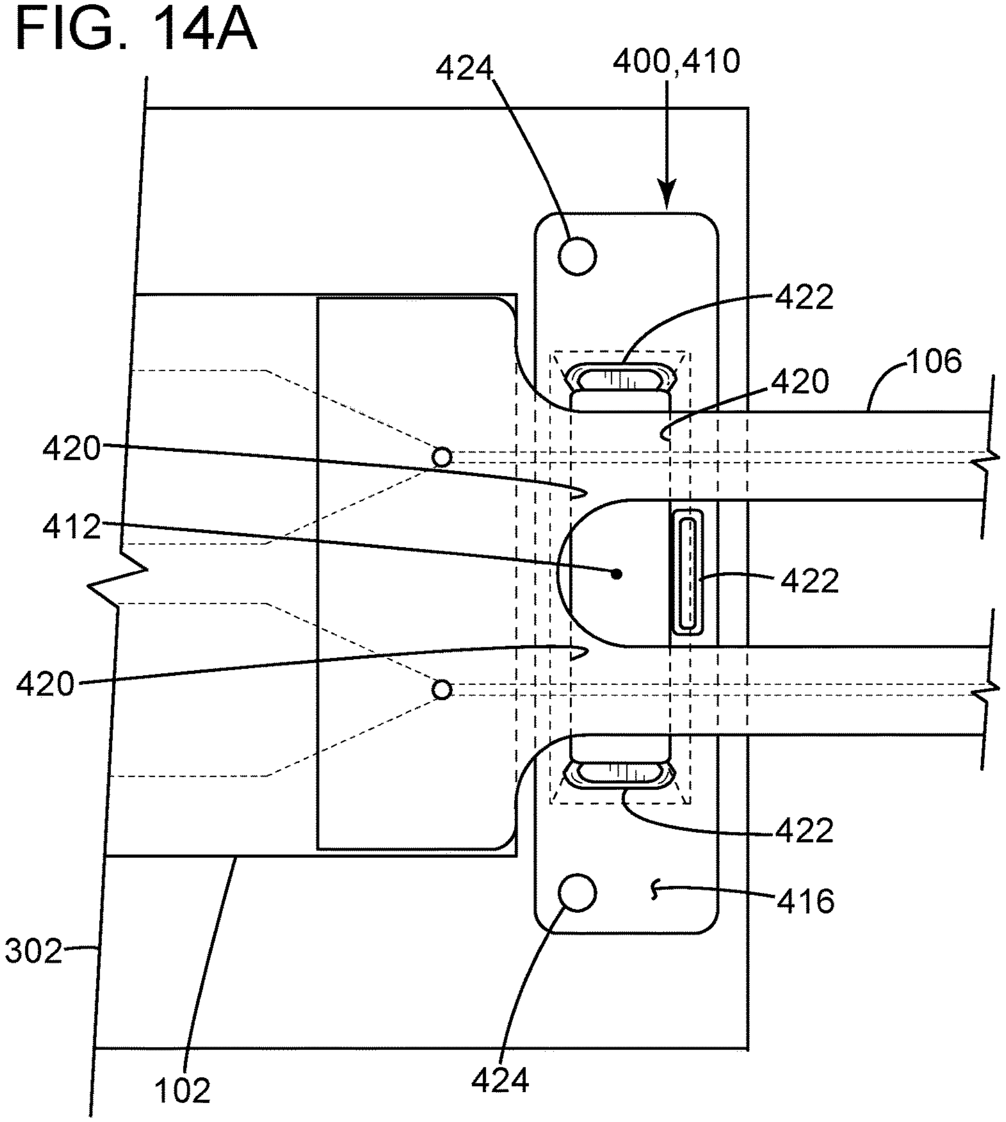
FIG. 14A depicts a top view of an example of a mechanical strain relief element fixedly coupled to a flexible connection, wherein the strain relief element is configured as a trough, in accordance with aspects disclosed herein.
Figure 14B:
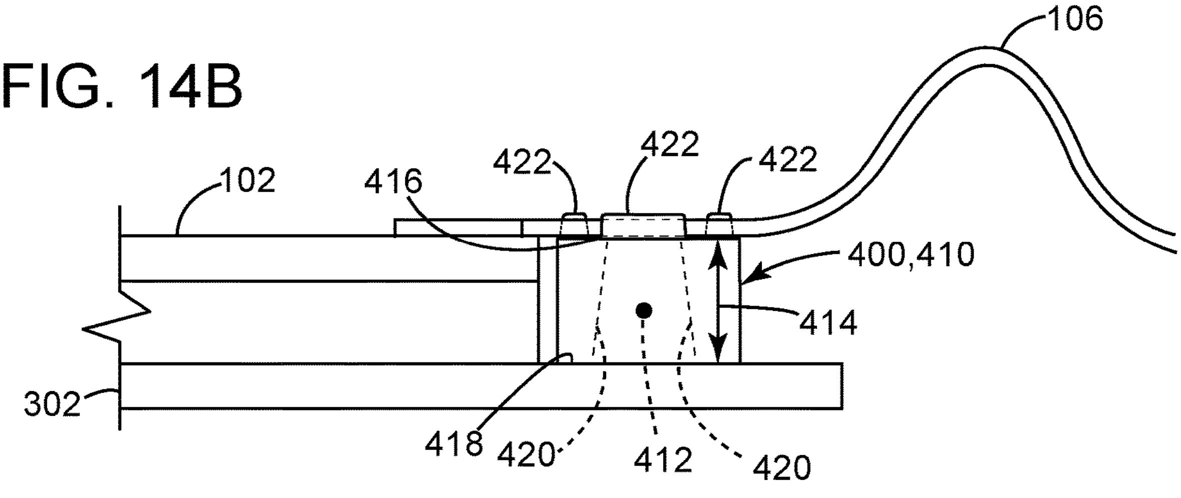
FIG. 14B depicts a side view of the example of the mechanical strain relief element of FIG. 14A in accordance with aspects disclosed herein.
Figure 14C:
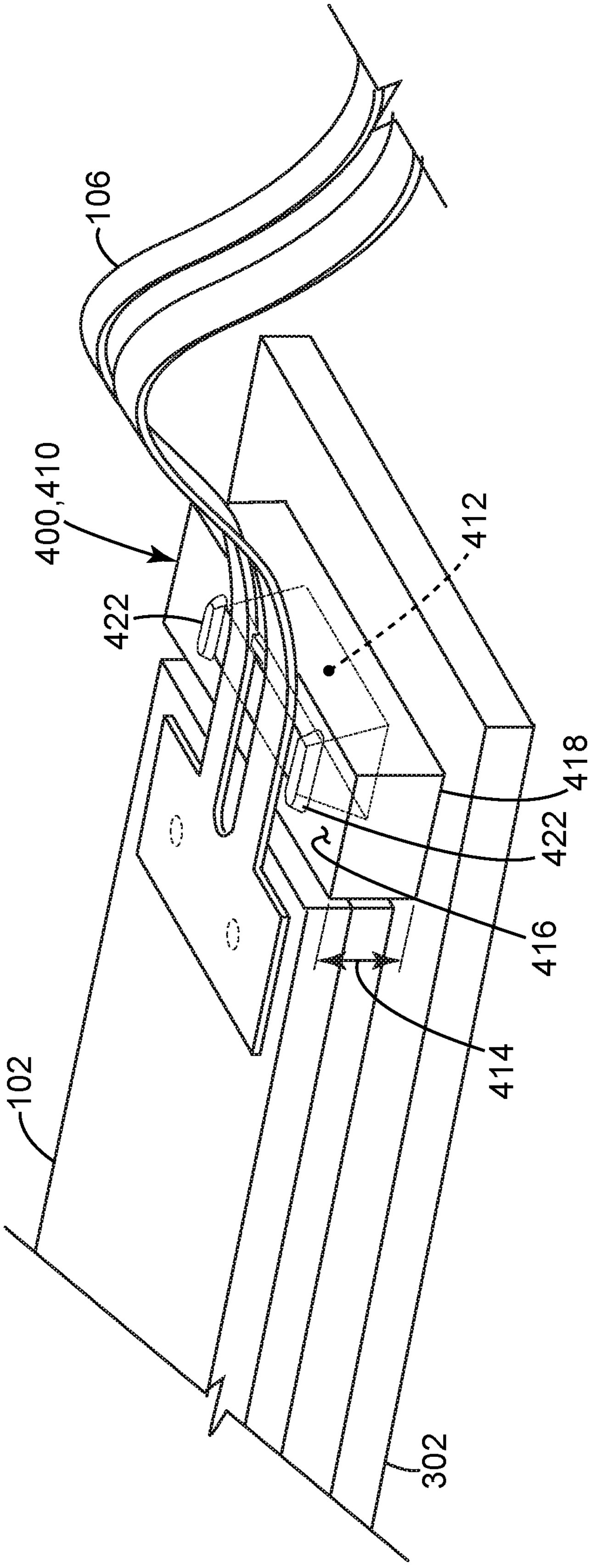
FIG. 14C depicts a perspective view of the example of the mechanical strain relief element of FIG. 14A in accordance with aspects disclosed herein.

Referring to FIGS. 14A, 14B and 14C, a top view (FIG. 14A), a side view (FIG. 14B) and a perspective view (FIG. 14C) of an example of the mechanical strain relief element 400 fixedly coupled to the flexible connection 106, wherein the strain relief element 400 is configured as a trough 410, is depicted. The trough 410 is positioned between the flexible connection 106 and the support fixture 302.

The trough 410, as illustrated, does not touch the flow cell 102. As such, the trough transfers a portion of the stress (e.g., shear forces) away from the connection between the flow cell 102 and the flexible connection 106 and redirects the stress into the support fixture 302 through the strain relief element 400. In other configurations, the trough 410 may include locating arms (not shown), which are used to align the trough 410 relative to the flow cell 102. However, the locating arms may not be designed to transfer any significant amount of force into the flow cell 102.

The trough 410 includes a relief cut 412 positioned into a central portion of the trough 410. The relief cut 412 can penetrate the entire width 414 of the trough 412, from the top surface 416 (i.e., the surface contacting the flexible connection 106) to the bottom surface 418 (i.e., the surface contacting the support fixture 302). The relief cut 412 forms a mold to contain and shape epoxy that is deposited into the relief cut 412 in order to bond the flexible connection 106 to the support fixture 302.

The walls 420 of the relief cut 412 are tapered outwardly from the top surface 416 to the bottom surface 418 of the trough 410. That is, a cross-sectional view of the relief cut 412 would look trapezoidal in shape, wherein the area of the relief cut 412 at the top surface 416 is less than the area of the relief cut 412 at the bottom surface 418. By providing a larger area at the bottom surface 418, a larger area of epoxy contacts the support fixture 302 than if the walls 420 were not tapered. This larger area of epoxy may provide a stronger bond between the support fixture 302 and the trough 410.

Though in the example illustrated in FIGS. 14A, 14B and 14C shows the walls 420 tapered outwardly, other configurations of walls may also be utilized. For example, the walls 420 may be tapered inwardly or the walls 420 may be vertical.

A plurality of adhesive support rims 422 are positioned around the outer perimeter of the top surface 416 of the relief cut 412. The adhesive support rims 422 project upwardly from the top surface 416. In this example, the adhesive support rims 422 project upwardly to about the level of the top surface of the flexible connection 106

The adhesive support rims 422 may enable the epoxy to make surface tension contact with the adhesive support rims 422, such that the top of the epoxy can extend above the top surface 416 of the trough 410. As such, the epoxy may more easily encapsulate the flexible connection 106 to provide a stronger bond between the flexible connection 106 and the epoxy within the trough 410.

Though in this implementation, the adhesive support rims 422 project up to the level of the top surface of the flexible connection 106, the adhesive support rims 422 may alternatively be designed to project up to different levels. This is because the height of the adhesive support rims 422 may be in part due to the type of epoxy used, in order to provide an optimal surface tension contact for the epoxy.

Fiducials (or through holes) 424 are positioned on and/or in the trough 410 in order to support automated pick and place manufacturing. More specifically, during manufacturing, a three axis pick and place machine may grab the trough 410 and a camera may then be utilized to look through the fiducials 424 to properly position the trough 410 on the support fixture 302.

The trough 410 may be made of a plastic, such as a polycarbonate or any other plastic that is compatible with injection molding. The trough 410 may be made as an injection molded part.

Figure 15A:
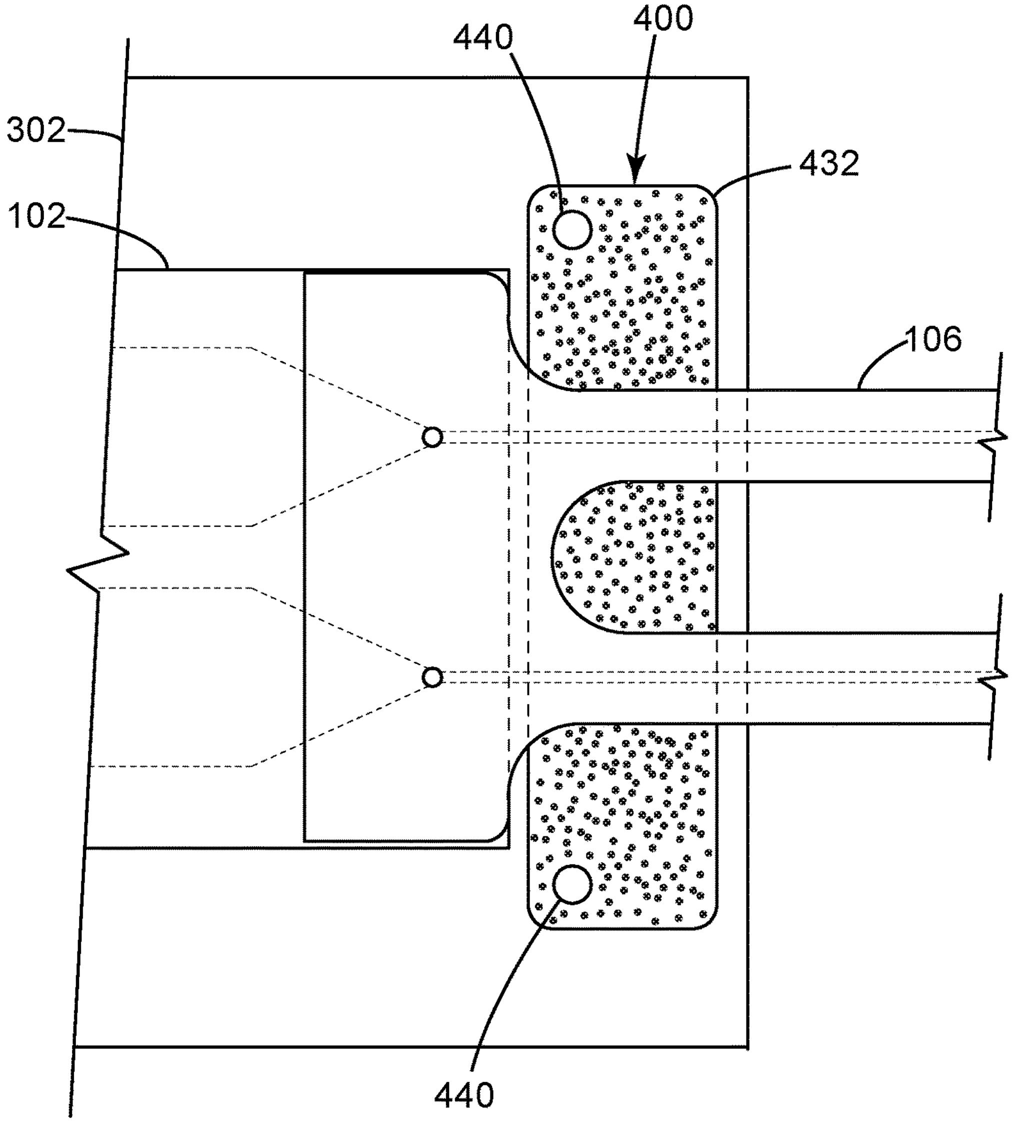
FIG. 15A depicts a top view of an example of a mechanical strain relief element fixedly coupled to a flexible connection, wherein the strain relief element is configured as a solid part having a first adhesive and a second adhesive bonded thereon, in accordance with aspects disclosed herein.
Figure 15B:
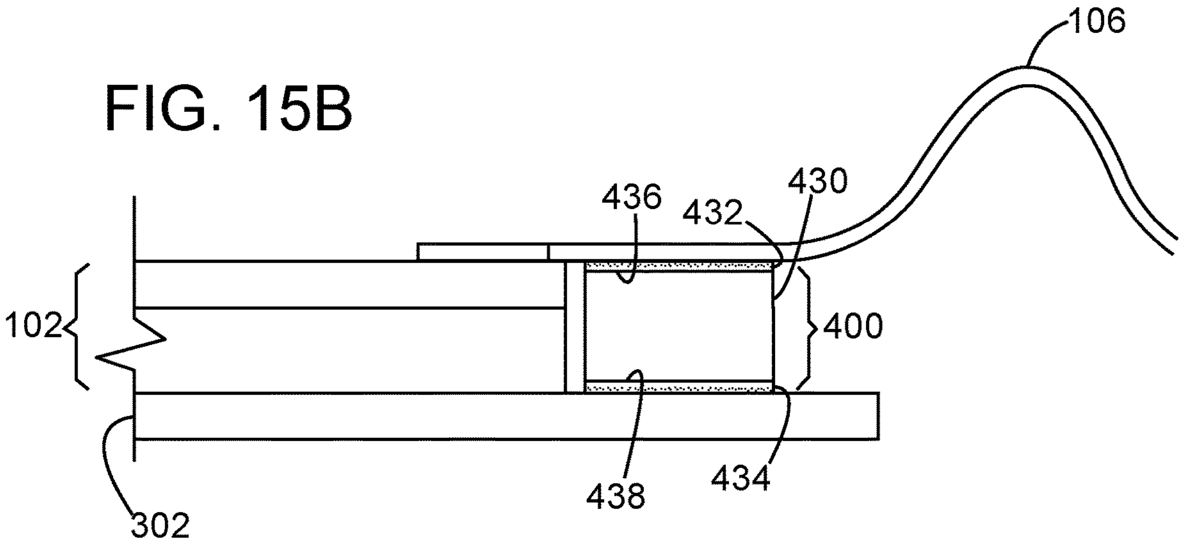
FIG. 15B depicts a side view of the example of the mechanical strain relief element of FIG. 15A in accordance with aspects disclosed herein.
Figure 15C:
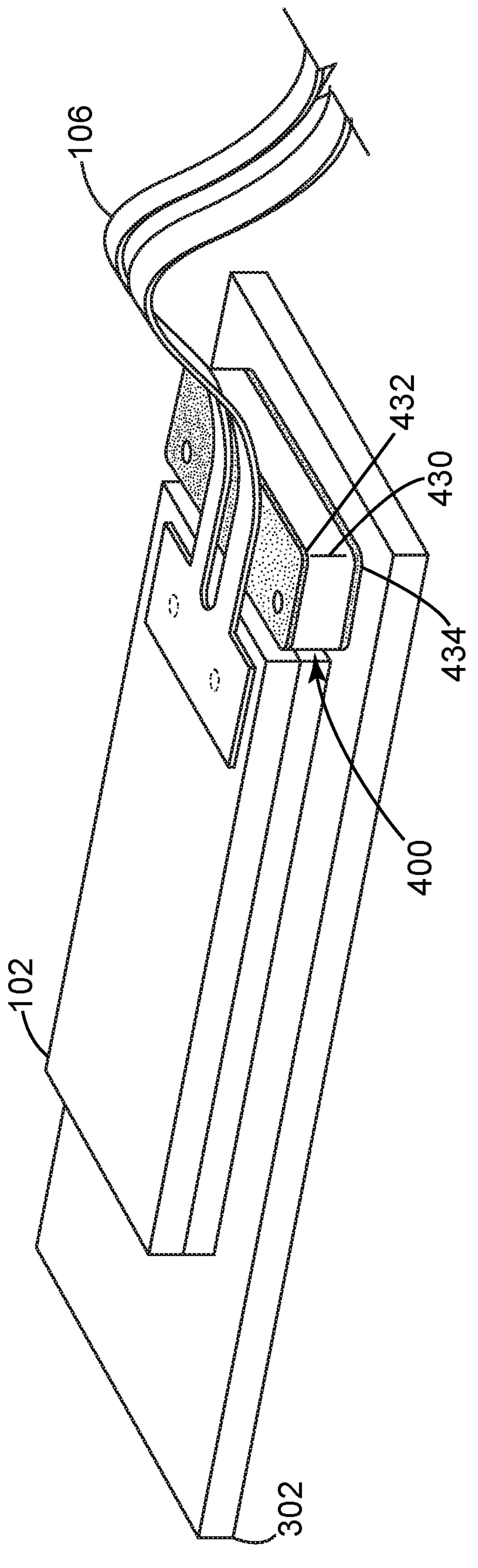
FIG. 15C depicts a perspective view of the example of the mechanical strain relief element of FIG. 15A in accordance with aspects disclosed herein.

Referring to FIGS. 15A, 15B and 15C, a top view (FIG. 15A), a side view (FIG. 15B) and a perspective view (FIG. 15C) of an example of the mechanical strain relief element 400 fixedly coupled to the flexible connection 106, wherein the strain relief element 400 is configured as a solid part 430 having a first adhesive 432, such as a pressure sensitive adhesive, and a second adhesive 434, such as a pressure sensitive adhesive, bonded thereon, is depicted. The solid part 430 is positioned between the flexible connection 106 and the support fixture 302.

The solid part 430 with the first and second adhesives 432, 434, as illustrated, does not touch the flow cell 102. As such, the solid part 430 transfer a portion of the stress (e.g., shear forces) away from the flow cell 102 and redirects the stress into the support fixture 302. In other configurations, the solid part 430 may include locating arms (not shown), which are used to align the solid part 430 relative to the flow cell 102. However, the locating arms may not be designed to transfer any significant amount of force into the flow cell 102.

The first adhesive 432 is placed between a top surface 436 (i.e., the surface located closest to the flexible connection 106) of the solid part 430 and the flexible connection 106. The second adhesive 434 is placed between a bottom surface 438 (i.e., the surface closest to the support fixture 302) of the solid part 430 and the support fixture 302. The first adhesive 432, second adhesive 434 and solid part 430 form a configuration of the strain relief element 400 that is a laminated structure which adheres to both the flexible connection 106 and the support fixture 302.

Fiducials (or through holes) 440 are positioned on the solid part 430 in order to support automated pick and place manufacturing. More specifically, during manufacturing, a three axis pick and place machine may grab the solid part 430 and a camera may then be utilized to look through the fiducials 440 to properly position the solid part 430 on the support fixture 302.

The solid part 430 may be made of a plastic, such as a polycarbonate or any other plastic that is compatible with injection molding. The solid part 430 may be made as an injection molded part.

An implementation of an instrument in accordance with one or more aspects of the present disclosure includes a reagent management system, a flexible connection and a flow cell. The reagent management system is operable to be positioned in the instrument. The reagent management system includes a plurality of reagent wells. Each reagent well is operable to contain a reagent of a plurality of reagents positioned therein. The reagent management system is operable to select a flow of reagent from one of the plurality of reagents. The flexible connection is operable to be positioned in the instrument. The flexible connection includes a first flexible channel in fluid communication with the reagent management system. The first flexible channel is operable to route the flow of reagent therethrough. The flow cell is operable to be positioned in the instrument. The flow cell includes a flow channel in fluid communication with the first flexible channel. The flow channel is operable to route the flow of reagent over analytes positioned in the flow channel. The flexible connection enables the flow cell to be moved by the instrument relative to a fixed reference point in the instrument.

In another implementation of the instrument, the flexible connection enables the flow cell to be moved relative to a fixed reference point in the instrument while a detection module of the instrument is held stationary relative to the reference point.

In another implementation of the instrument, the instrument includes a cartridge. The cartridge includes the reagent management system, the flow cell and the flexible connection therebetween. When the cartridge is engaged with the instrument and the flow cell is engaged with the cartridge, the reagent management system is fixed relative to the reference point of the instrument while the flow cell is movable relative to the reference point of the instrument.

In another implementation of the instrument, the reagent management system is positioned relative to the reference point within about a predetermined first tolerance range. The flow cell is positioned relative to the reference point within about a second predetermined tolerance range. The first tolerance range is at least 10 times greater than the second tolerance range.

In another implementation of the instrument, the flexible connection includes a second flexible channel in fluid communication with the flow channel of the flow cell. The second flexible channel is operable to route the flow of reagent from the flow cell to the reagent management system after the flow of reagent has passed through the flow channel.

In another implementation of the instrument, the flexible connection includes a slit positioned between the first and second flexible channels to reduce a force involved to move the flexible connection.

In another implementation of the instrument, the flexible connection has a sinuous shape to reduce a force involved to move the flexible connection.

In another implementation of the instrument, the flexible connection includes: a top layer defining a top of the first flexible channel, a bottom layer defining a bottom of the first flexible channel, and an intermediate layer defining a wall width and a channel width of the first flexible channel. The ratio of the wall width to the channel width is about 2.5 or greater.

In another implementation of the instrument, the instrument includes a detection module. As the flow of reagent is routed over the analytes, a chemical reaction is performed between the flow of reagent and the analytes. The chemical reaction induces the analytes to affect detectable properties related to the analytes. The detection module is operable to detect the detectable properties as the flow cell moves relative to the detection module.

In another implementation of the instrument, the intermediate layer is a plurality of sublayers.

In another implementation of the instrument, the top, intermediate and bottom layers are bonded together utilizing one of an adhesive bonding process, a thermal bonding process and a direct laser bonding process.

An implementation of a cartridge in accordance with one or more aspects of the present disclosure includes a reagent management system, a flexible connection and a flow cell. the reagent management system is operable to select a flow of reagent from one of a plurality of reagents contained in the reagent management system. The flexible connection is operable to be positioned in the cartridge. The flexible connection includes a first flexible channel in fluid communication with the reagent management system. The first flexible channel is operable to route the flow of reagent therethrough. The flow cell is operable to be positioned in the cartridge. The flow cell includes a flow channel in fluid communication with the first flexible channel. The flow channel is operable to route the flow of reagents over analytes positioned in the flow channel. When the cartridge is engaged with an instrument, the flexible connection enables the flow cell to be moved by the instrument relative to a fixed reference point in the instrument.

In another implementation of the cartridge, the flexible connection includes a second flexible channel in fluid communication with the flow channel of the flow cell. The second flexible channel is operable to route the flow of reagent from the flow cell to the reagent management system after the flow of reagent has passed through the flow channel.

In another implementation of the cartridge, the flexible connection includes a slit positioned between the first and second flexible channels to reduce a force involved to move the flexible connection.

In another implementation of the cartridge, the flexible connection has a sinuous shape to reduce a force involved to move the flexible connection.

In another implementation of the cartridge, the flexible connection includes: a top layer defining a top of the first flexible channel, a bottom layer defining a bottom of the first flexible channel, and an intermediate layer defining a wall width and a channel width of the first flexible channel. The ratio of the wall width to the channel width is about 2.5 or greater.

An implementation of a flexible connection module in accordance with one or more aspects of the present disclosure includes a flexible connection and a flow cell. The flexible connection includes a first channel inlet via, a first channel outlet via and a first flexible channel in fluid communication therebetween. The first channel inlet via includes a fluidic seal operable to connect to a reagent management system outlet port and to enable a flow of reagent therethrough. The flow cell includes an inlet port, an outlet port and a flow channel in fluid communication therebetween. The inlet port is in fluid communication with the first channel outlet via of the flexible connection. The flow channel is operable to route the flow of reagent over analytes positioned in the flow channel.

In another implementation of the flexible connection module, the flexible connection includes a second channel inlet via, a second channel outlet via and a second flexible channel in fluid communication therebetween. The second channel inlet via is in fluid communication with the outlet port of the flow cell. The second channel outlet via includes a fluidic seal operable to connect to a reagent management system inlet port and to enable the flow of reagent therethrough.

In another implementation of the flexible connection module, the fluidic seal is a detachable fluidic seal operable to detachably connect to the reagent management system outlet port and to enable the flow of reagent therethrough.

In another implementation of the flexible connection module, the flexible connection module includes a support fixture. The support fixture includes an inner border surrounding the flow cell. The support fixture is operable to contain the flow cell within the border and to enable the flow cell to move laterally and longitudinally therein.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the forgoing disclosure has been described by reference to specific examples, it should be understood that numerous changes may be made within the spirit and scope of the inventive concepts described. Accordingly, it is intended that the disclosure is not be limited to the described examples, but that it has the full scope defined by the language of the following claims.

What is claimed is:

1. An instrument comprising:

a reagent management system, operable to be positioned in the instrument, the reagent management system comprising a plurality of reagent wells, each reagent well operable to contain a reagent of a plurality of reagents positioned therein, the reagent management system operable to select a flow of reagent from one of the plurality of reagent wells;

a flexible connection comprised of a laminate stack and operable to be positioned in the instrument, the flexible connection comprising a first channel inlet via and a first channel outlet via connected therebetween by a first flexible channel, the first channel inlet via in fluid communication with the reagent management system, the first flexible channel operable to route the flow of reagent therethrough, wherein the laminate stack of the flexible connection comprises a top layer, a bottom layer and an intermediate layer therebetween, the intermediate layer comprises a laminate stack of alternating intermediate sublayers and adhesive layers through which the first flexible channel passes, wherein, within the intermediate layer, the ratio of volume of the adhesive layers to the total volume of the adhesive layers plus the intermediate sublayers is between about 50 percent to 25 percent, wherein the first flexible channel has a burst pressure of 40 psig or greater, wherein the burst pressure of the first flexible channel is the pressure at which leaks will develop in the first flexible channel, wherein the flexible connection comprises a sinuous shape of a letter S, and the flexible connection comprises a flexibility, the flexibility defined as enabling a second distal end of the flexible connection to be moved a distance of about 20 percent of the overall length of the flexible connection in an X direction toward a first distal end of the flexible connection and, thereafter, move the second distal end of the flexible connection a distance of four millimeters in a direction perpendicular to the X direction with less than 0.1 newtons of force;

a flow cell, operable to be positioned in the instrument, the flow cell comprising an inlet port and an outlet port connected therebetween by a flow channel, the inlet port of the flow cell connected to the first channel outlet via of the flexible connection, the flow channel in fluid communication with the first flexible channel, the flow channel operable to route the flow of reagent over analytes positioned in the flow channel; and a detection module;

wherein the reagent management system and the flow cell are mechanically and flexibly connected together by the flexible connection; and wherein the flow cell is moveable by the instrument relative to a fixed reference point in the instrument and relative to the reagent management system due to a movement of the flexible connection that occurs while the flow cell is moved.

2. The instrument of claim 1, wherein the flow cell is moveable relative to the fixed reference point in the instrument while the detection module is held stationary relative to the reference point.

3. The instrument of claim 1, comprising:

a cartridge, the cartridge comprising the reagent management system, the flow cell and the flexible connection;

wherein, when the cartridge is engaged with the instrument and the flow cell is engaged with the cartridge, the reagent management system is fixed relative to the reference point of the instrument while the flow cell is movable relative to the reference point of the instrument.

4. The instrument of claim 1, wherein:

the reagent management system is positioned relative to the reference point within about a predetermined first tolerance range; and the flow cell is positioned relative to the reference point within about a second predetermined tolerance range, the first tolerance range being at least 10 times greater than the second tolerance range.

5. The instrument of claim 1, wherein the flexible connection comprises a second flexible channel in fluid communication with the flow channel of the flow cell, the second flexible channel operable to route the flow of reagent from the flow cell to the reagent management system after the flow of reagent has passed through the flow channel.

6. The instrument of claim 1, wherein:

the intermediate layer defines a wall width and a channel width of the first flexible channel; and a ratio of the wall width to the channel width is greater than about 2.5.

7. The instrument of claim 6, wherein the top layer, intermediate layer and bottom layer are bonded together utilizing one of an adhesive bonding process, a thermal bonding process or a direct laser bonding process.

8. The instrument of claim 1, wherein, as the flow of reagent is routed through the flow channel, a chemical reaction is performed between the flow of reagent and the analytes, the chemical reaction inducing the analytes to affect detectable properties related to the analytes; and wherein the detection module is operable to detect the detectable properties.

9. The instrument of claim 1, comprising:

a support fixture operable to provide support to the flow cell; and a mechanical strain relief element fixedly coupled to the flexible connection and the support fixture and not touching the flow cell, the mechanical strain relief element operable to direct mechanical stress imposed upon the flexible connection during movement of the flow cell from the flexible connection to the support fixture.

10. The instrument of claim 1, wherein the flow cell is operable to be moved in any combination of linear directions along an X axis and a Y axis of two dimensional space to a position relative to the reference point within a tolerance range in each linear direction of plus or minus 100 microns or less, and wherein the movement in the linear direction along the X axis is independent of the movement in the linear direction along the Y axis.

11. The instrument of claim 10, wherein the flow cell is operable to be moved in any combination of rotational movement about the X axis and the Y axis.

12. The instrument of claim 10, wherein the reference point is a focal area of sensing devices or cameras of the detection module.

13. The instrument of claim 1, wherein the inlet port of the flow cell is bonded to the first channel outlet via the flexible connection to form a fluidic seal therebetween.

14. The instrument of claim 1, wherein the flexible connection has a laminate height of between 30 microns to 3000 microns, the first flexible channel has a channel height of between 10 microns to 1000 microns, and the ratio of the wall width of the first flexible channel to the channel width of the first flexible channel is 2.5 or greater.

15. The instrument of claim 1, wherein the first channel outlet via of the flexible connection and the inlet port of the flow cell are sealed together by an adhesive layer.

16. The instrument of claim 1, wherein the adhesive layers of the intermediate layer comprise at least one of an acrylic based adhesive, a silicone based adhesive, a heat activated adhesive, a pressure activated adhesive, a light activated adhesive or an epoxy adhesive.

17. A cartridge comprising:

a reagent management system operable to select a flow of reagent from one of a plurality of reagents contained in the reagent management system;

a flexible connection formed from a laminate stack and comprising a first channel inlet via and a first channel outlet via connected therebetween by a first flexible channel, the first channel inlet via in fluid communication with the reagent management system, the first flexible channel being operable to route the flow of reagent therethrough, wherein the laminate stack of the flexible connection comprises a top layer, a bottom layer and an intermediate layer therebetween, the intermediate layer comprises a laminate stack of alternating intermediate sublayers and adhesive layers through which the first flexible channel passes, wherein, within the intermediate layer, the ratio of volume of the adhesive layers to the total volume of the adhesive layers plus the intermediate sublayers is between about 50 percent to 25 percent, wherein the first flexible channel has a burst pressure of 40 psig or greater, wherein the burst pressure of the first flexible channel is the pressure at which leaks will develop in the first flexible channel, wherein the flexible connection comprises a sinuous shape of a letter S, and the flexible connection comprises a flexibility, the flexibility defined as enabling a second distal end of the flexible connection to be moved a distance of about 20 percent of the overall length of the flexible connection in an X direction toward a first distal end of the flexible connection and, thereafter, move the second distal end of the flexible connection a distance of four millimeters in a direction perpendicular to the X direction with less than 0.1 newtons of force; and a flow cell comprising an inlet port and an outlet port connected therebetween by a flow channel, the inlet port of the flow cell connected to the first channel outlet via of the flexible connection, the flow channel in fluid communication with the first flexible channel, the flow channel operable to route the flow of reagents over analytes positioned in the flow channel;

wherein the reagent management system and the flow cell are mechanically and flexibly connected together by the flexible connection; and wherein the flexible connection enables the flow cell to be moved relative to the reagent management system due to a movement of the flexible connection that occurs while the flow cell is moved.

18. The cartridge of claim 17, wherein the flexible connection comprises a second flexible channel in fluid communication with the flow channel of the flow cell, the second flexible channel operable to route the flow of reagent from the flow cell to the reagent management system after the flow of reagent has passed through the flow channel.

19. The cartridge of claim 17, wherein:
the intermediate layer defines a wall width and a channel width of the first flexible channel; and
a ratio of the wall width to the channel width is greater than about 2.5.

20. The cartridge of claim 17, comprising:
a support fixture operable to provide support to the flow cell; and
a mechanical strain relief element fixedly coupled to the flexible connection and the support fixture and not touching the flow cell, the mechanical strain relief element operable to direct mechanical stress imposed upon the flexible connection during movement of the flow cell from the flexible connection to the support fixture.

21. The cartridge of claim 17, wherein the flow cell is operable to be moved in any combination of linear directions along an X axis and a Y axis of two dimensional space and any combination of rotational movement about the X axis and the Y axis to a position relative to a reference point on the reagent management system within a tolerance range in each linear direction of plus or minus 100 microns or less, and wherein the movement in the linear direction along the X axis is independent of the movement in the linear direction along the Y axis.

22. The cartridge of claim 17, wherein the inlet port of the flow cell is bonded to the first channel outlet via of the flexible connection to form a fluidic seal therebetween.

23. The cartridge of claim 17, wherein the first channel outlet via of the flexible connection and the inlet port of the flow cell are sealed together by an adhesive layer.

24. The cartridge of claim 17, wherein the adhesive layers of the intermediate layer comprise at least one of an acrylic based adhesive, a silicone based adhesive, a heat activated adhesive, a pressure activated adhesive, a light activated adhesive or an epoxy adhesive.

25. A flexible connection module comprising:
a flexible connection formed from a laminate stack and comprising a first channel inlet via, a first channel outlet via, and a first flexible channel in fluid communication therebetween, wherein the first channel inlet via comprises a fluidic seal operable to connect to a reagent management system outlet port and to enable a flow of reagent therethrough, wherein the laminate stack of the flexible connection comprises a top layer, a bottom layer and an intermediate layer therebetween, the intermediate layer comprises a laminate stack of alternating intermediate sublayers and adhesive layers through which the first flexible channel passes, wherein, within the intermediate layer, the ratio of volume of the adhesive layers to the total volume of the adhesive layers plus the intermediate sublayers is between about 50 percent to 25 percent, wherein the first flexible channel has a burst pressure of 40 psig or greater, wherein the burst pressure of the first flexible channel is the pressure at which leaks will develop in the first flexible channel, wherein the flexible connection comprises a sinuous shape of a letter S, and the flexible connection comprises a flexibility, the flexibility defined as enabling a second distal end of the flexible connection to be moved a distance of about 20 percent of the overall length of the flexible connection in an X direction toward a first distal end of the flexible connection and, thereafter, move the second distal end of the flexible connection a distance of four millimeters in a direction perpendicular to the X direction with less than 0.1 newtons of force;
a flow cell comprising an inlet port, an outlet port, and a flow channel in fluid communication therebetween, wherein the inlet port is in fluid communication with the first channel outlet via of the flexible connection, the flow channel operable to route the flow of reagent over analytes positioned in the flow channel;
wherein the flexible connection enables the flow cell to be moved relative to the reagent management system due to a movement of the flexible connection that occurs while the flow cell is moved;
a support fixture operable to provide support to the flow cell; and
a mechanical strain relief element positioned between the support fixture and the flexible connection, the mechanical strain relief element epoxy bonded to both the flexible connection and the support fixture and not touching the flow cell, the mechanical strain relief element operable to direct mechanical stress imposed upon the flexible connection during movement of the flow cell from the flexible connection to the support fixture.

26. The flexible connection module of claim 25, wherein the flexible connection comprises:
a second channel inlet via, a second channel outlet via and a second flexible channel in fluid communication therebetween;
wherein the second channel inlet via is in fluid communication with the outlet port of the flow cell; and
wherein the second channel outlet via comprises a fluidic seal operable to connect to a reagent management system inlet port and to enable the flow of reagent therethrough.

27. The module of claim 25, wherein the fluidic seal is a detachable fluidic seal operable to detachably connect to the reagent management system outlet port and to enable the flow of reagent therethrough.

28. The module of claim 25, wherein the support fixture comprises:
an inner border surrounding the flow cell, the support fixture operable to contain the flow cell within the inner border and to enable the flow cell to move laterally and longitudinally therein.

29. The flexible connection module of claim 25, wherein the mechanical strain relief element comprises a trough, the trough comprising:
a solid piece having a top surface and a bottom surface, and
a relief cut positioned in a central portion of the trough, the relief cut penetrating at least a portion of the solid piece from the top surface toward the bottom surface, wherein the relief cut forms a mold to contain and shape the epoxy that is deposited into the relief cut in order to bond the flexible connection to the mechanical strain relief element.

30. The flexible connection module of claim 25, wherein the first channel outlet via of the flexible connection and the inlet port of the flow cell are sealed together by an adhesive layer.

31. The flexible connection module of claim 25, wherein the adhesive layers of the intermediate layer comprise at least one of an acrylic based adhesive, a silicone based adhesive, a heat activated adhesive, a pressure activated adhesive, a light activated adhesive or an epoxy adhesive.

* * * * *